United States Patent
Jachetta et al.

(10) Patent No.: US 7,920,789 B1
(45) Date of Patent: Apr. 5, 2011

(54) SYSTEM FOR COMMUNICATION OF VIDEO, AUDIO, DATA, CONTROL OR OTHER SIGNALS OVER FIBER

(75) Inventors: Vincent Jachetta, Locust Valley, NY (US); Brian C. Moore, Smithtown, NY (US); James G. Jachetta, Locust Valley, NY (US); Francis P. Jachetta, Oyster Bay, NY (US)

(73) Assignee: Multidyne Electronics Inc., Locust Valley, NY (US)

( * ) Notice: Subject to any disclaimer, the term of this patent is extended or adjusted under 35 U.S.C. 154(b) by 0 days.

(21) Appl. No.: 12/348,633

(22) Filed: Jan. 5, 2009

Related U.S. Application Data

(63) Continuation of application No. 11/056,466, filed on Feb. 11, 2005, now Pat. No. 7,474,852.

(60) Provisional application No. 60/544,140, filed on Feb. 12, 2004.

(51) Int. Cl.
*H04B 10/08* (2006.01)

(52) U.S. Cl. ................ 398/33; 398/35; 398/70; 398/71; 398/72

(58) Field of Classification Search ............ 398/70, 398/68, 118, 115, 154, 110, 33, 35, 66, 71, 398/72; 348/159, E70.085, 143, 59, 161; 725/140, 135, 143, 147, 152

See application file for complete search history.

(56) References Cited

U.S. PATENT DOCUMENTS

| | | | | |
|---|---|---|---|---|
| 4,673,974 A * | 6/1987 | Ito et al. | ........................ | 348/159 |
| 4,943,854 A * | 7/1990 | Shiota et al. | ................... | 348/159 |
| 4,977,449 A * | 12/1990 | Morgan | ......................... | 725/74 |
| 5,978,651 A * | 11/1999 | Eto et al. | ..................... | 348/14.13 |
| 6,008,867 A * | 12/1999 | Cooper et al. | ................ | 348/159 |
| 6,643,829 B1 * | 11/2003 | Borkovic et al. | ............. | 716/103 |
| 6,646,677 B2 * | 11/2003 | Noro et al. | ..................... | 348/156 |
| 6,698,021 B1 * | 2/2004 | Amini et al. | ................... | 725/105 |
| 6,731,880 B2 * | 5/2004 | Westbrook et al. | ........... | 398/115 |
| 7,124,427 B1 * | 10/2006 | Esbensen | ....................... | 725/109 |
| 7,190,392 B1 * | 3/2007 | Maguire, Jr. | .................. | 348/121 |
| 7,200,868 B2 * | 4/2007 | Mattox et al. | ................... | 726/26 |
| 2002/0171741 A1 * | 11/2002 | Tonkin et al. | .............. | 348/211.3 |
| 2003/0159143 A1 * | 8/2003 | Chan | ............................... | 725/41 |
| 2004/0136712 A1 * | 7/2004 | Stiscia et al. | .................... | 398/60 |
| 2006/0129961 A1 * | 6/2006 | Paul et al. | ......................... | 716/6 |
| 2009/0080884 A1 * | 3/2009 | Gerszberg et al. | .............. | 398/45 |

* cited by examiner

*Primary Examiner* — Ken N Vanderpuye
*Assistant Examiner* — Hibret A Woldekidan
(74) *Attorney, Agent, or Firm* — Ryan, Mason & Lewis, LLP

(57) ABSTRACT

A system for communication of signals between remote devices and monitoring and control devices via fiber. The system in accordance with one aspect of the invention includes a plurality of remote interface units each coupled to a corresponding one of the remote devices, a base unit coupled to one or more monitoring devices and one or more control devices, and a central hub coupled between the base unit and the plurality of remote interface units. The central hub is coupled to the base unit by a first fiber optic link, and is coupled to the remote interface units by additional fiber optic links.

24 Claims, 18 Drawing Sheets

OVERALL BLOCK

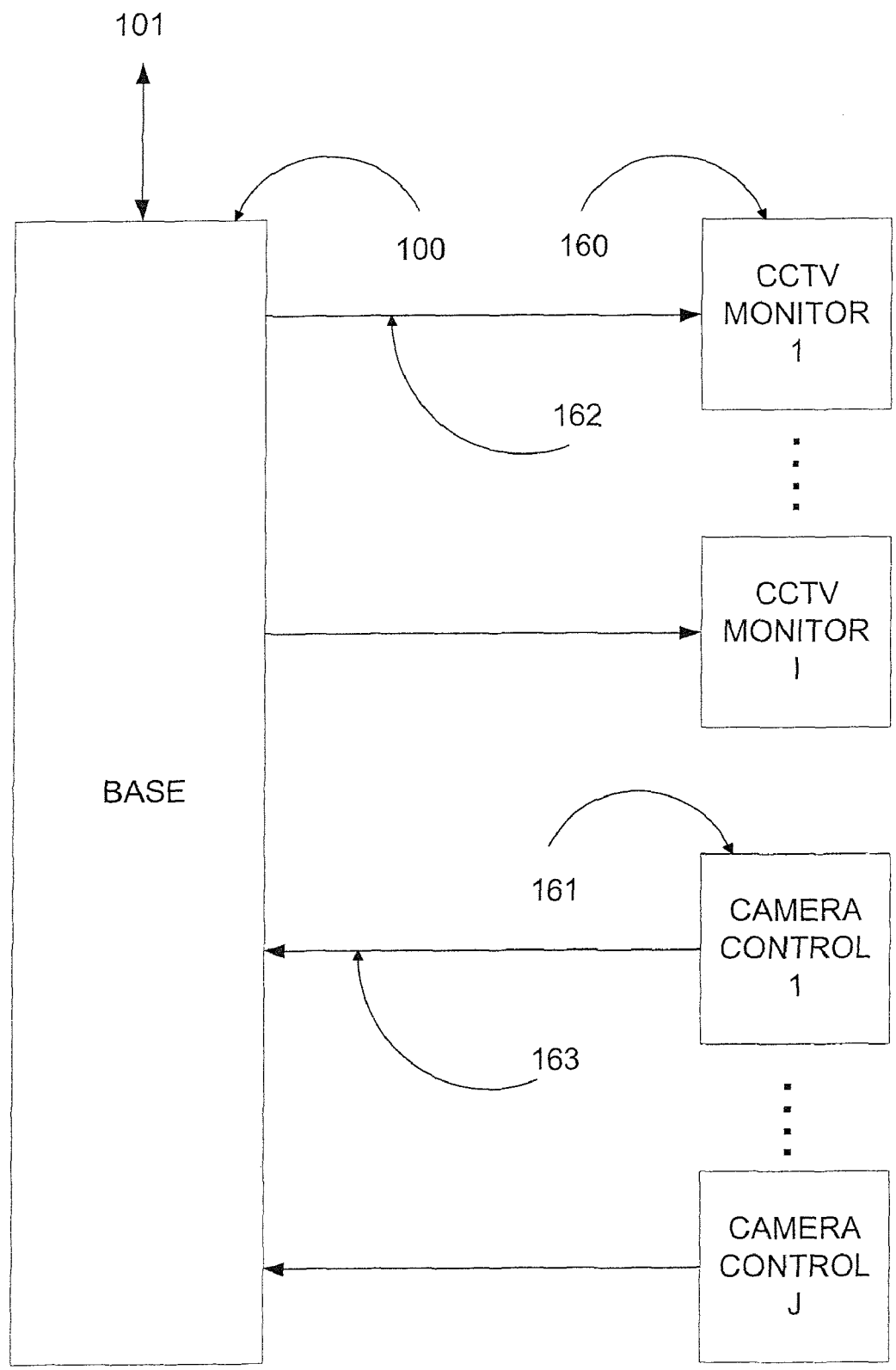
FIGURE 1B OVERALL BLOCK

OVERALL BLOCK, CURRENT STATE-OF-THE-ART

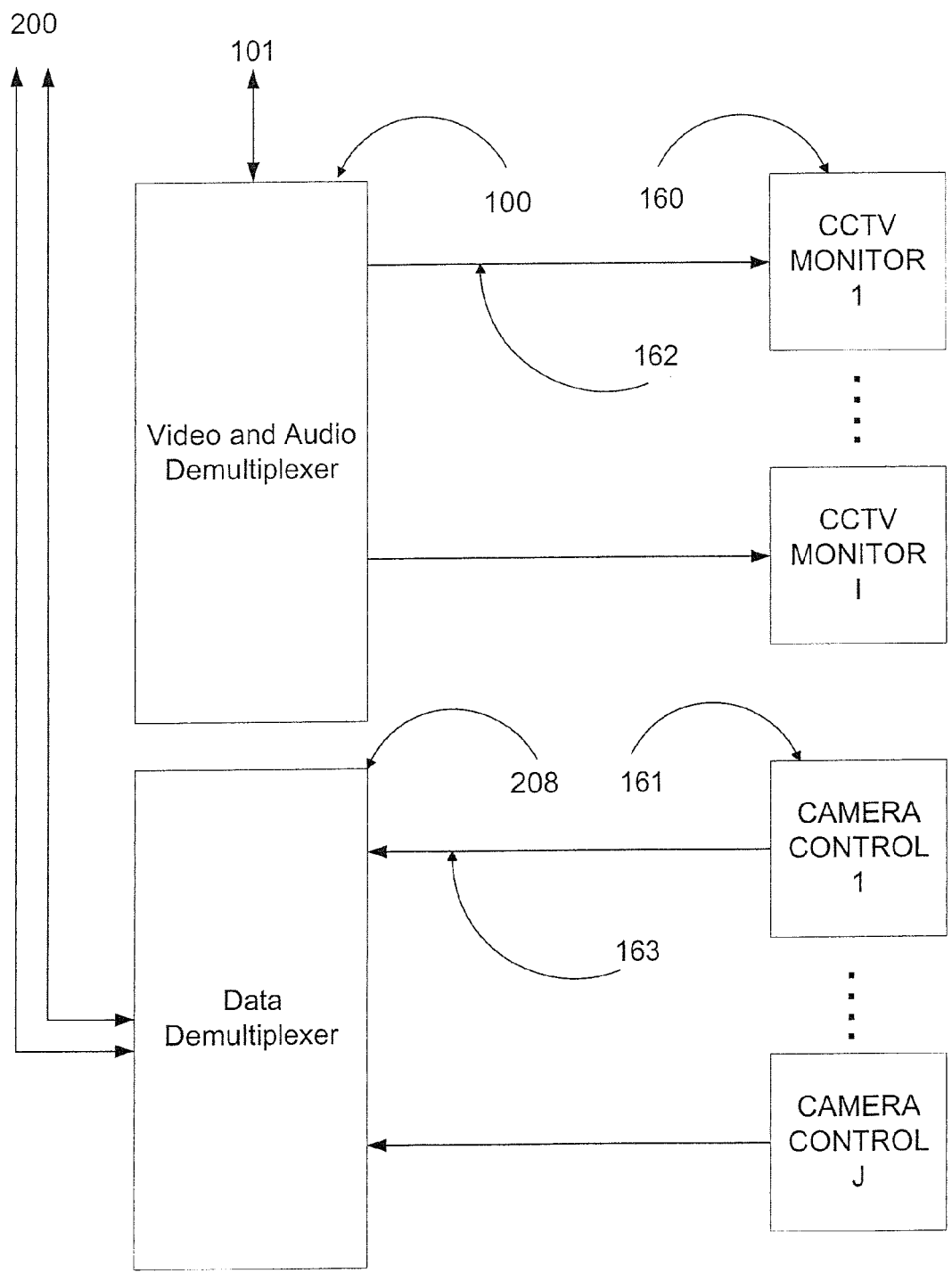
FIGURE 1D OVERALL BLOCK, CURRENT STATE-OF-THE-ART

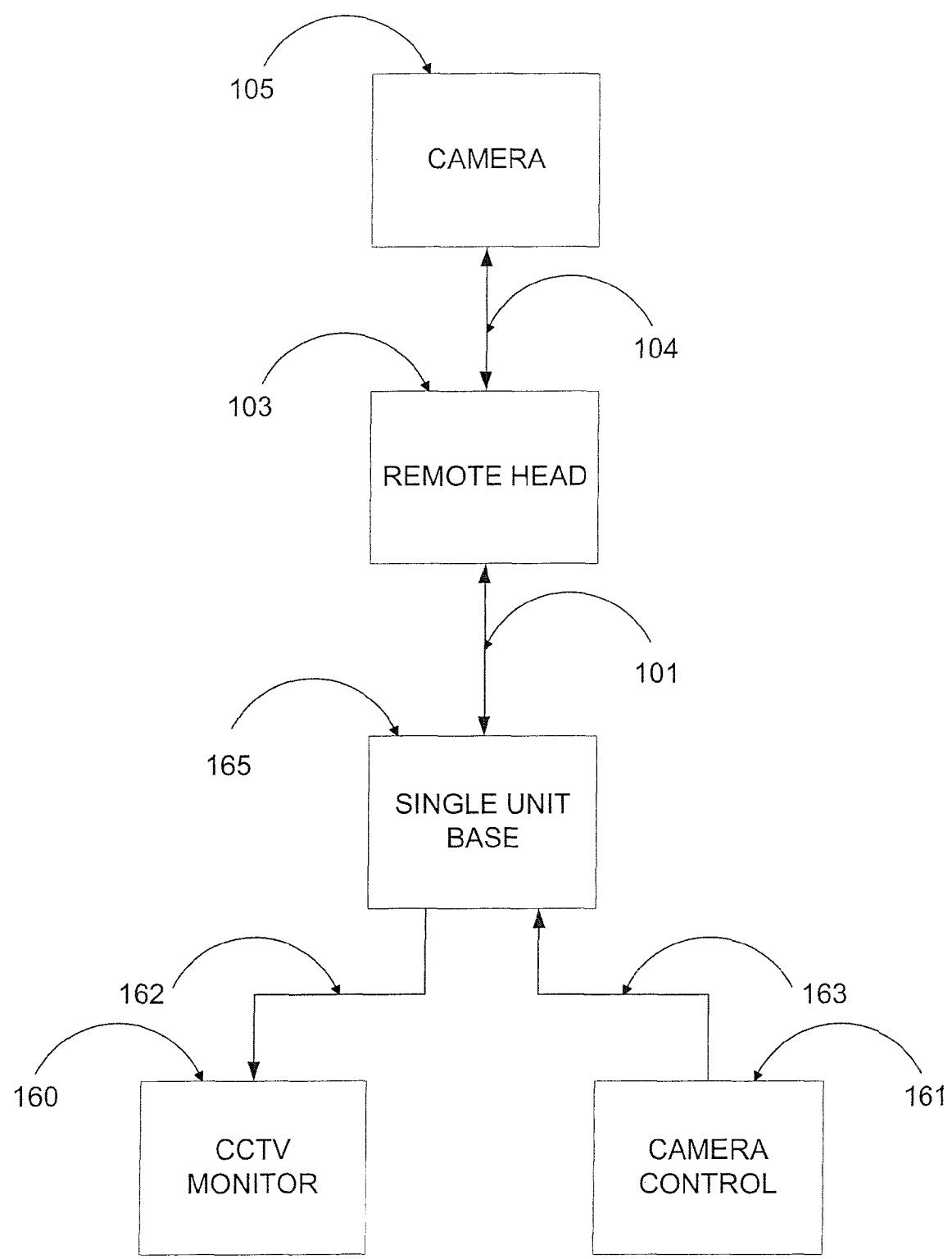
FIGURE 2: SINGLE CAMERA SYSTEM

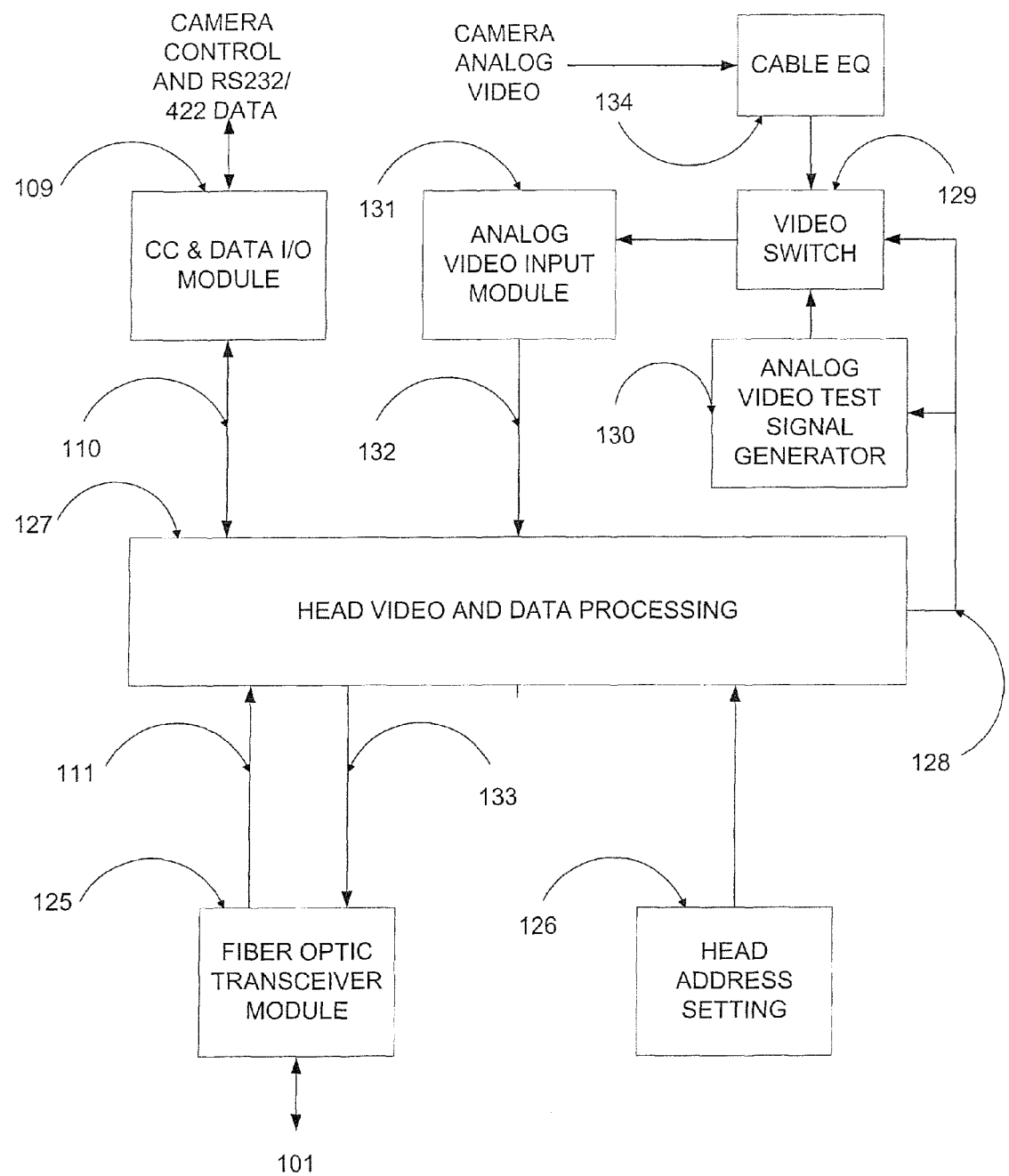
FIGURE 3: HEAD (103)

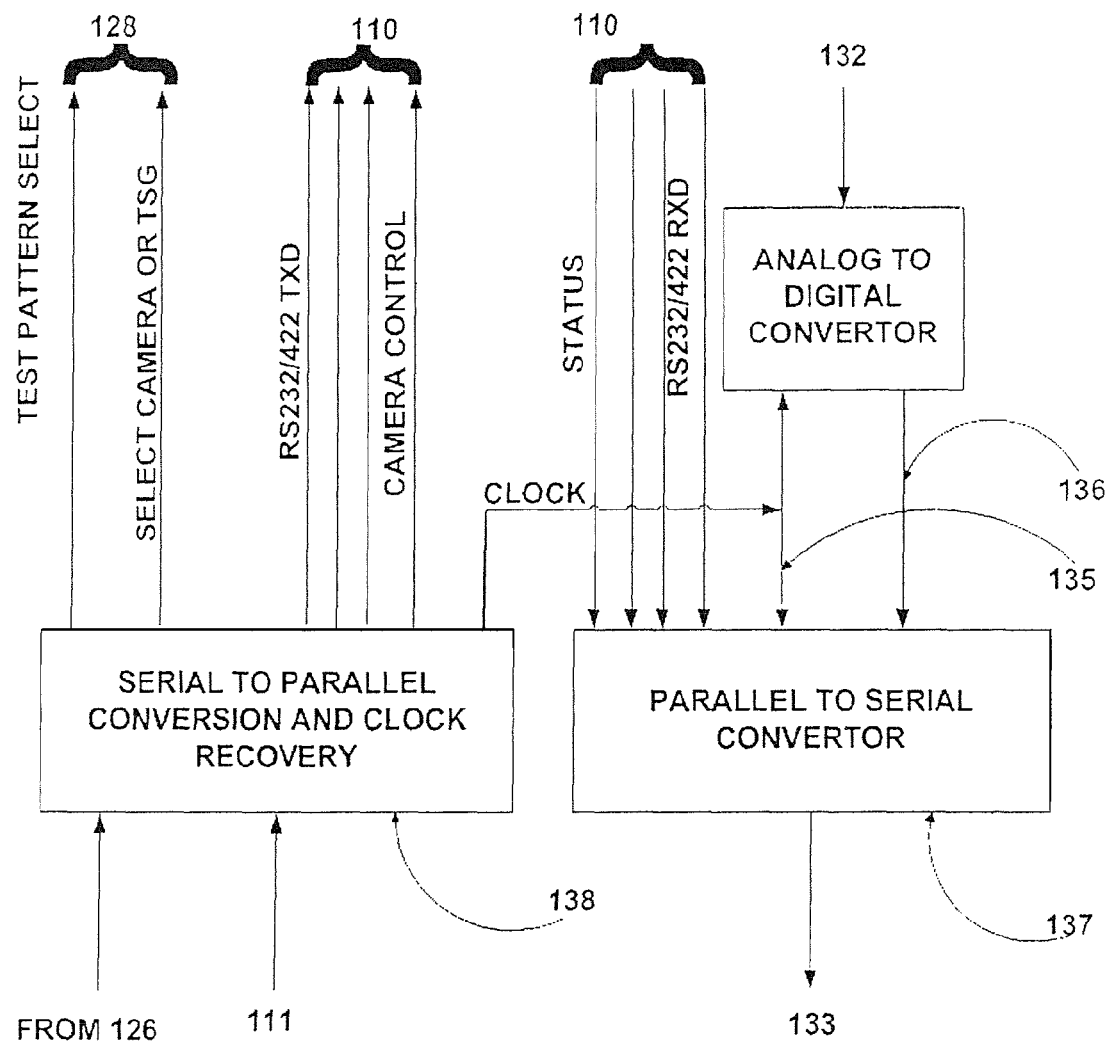
FIGURE 4: HEAD VIDEO AND DATA PROCESSING (127)

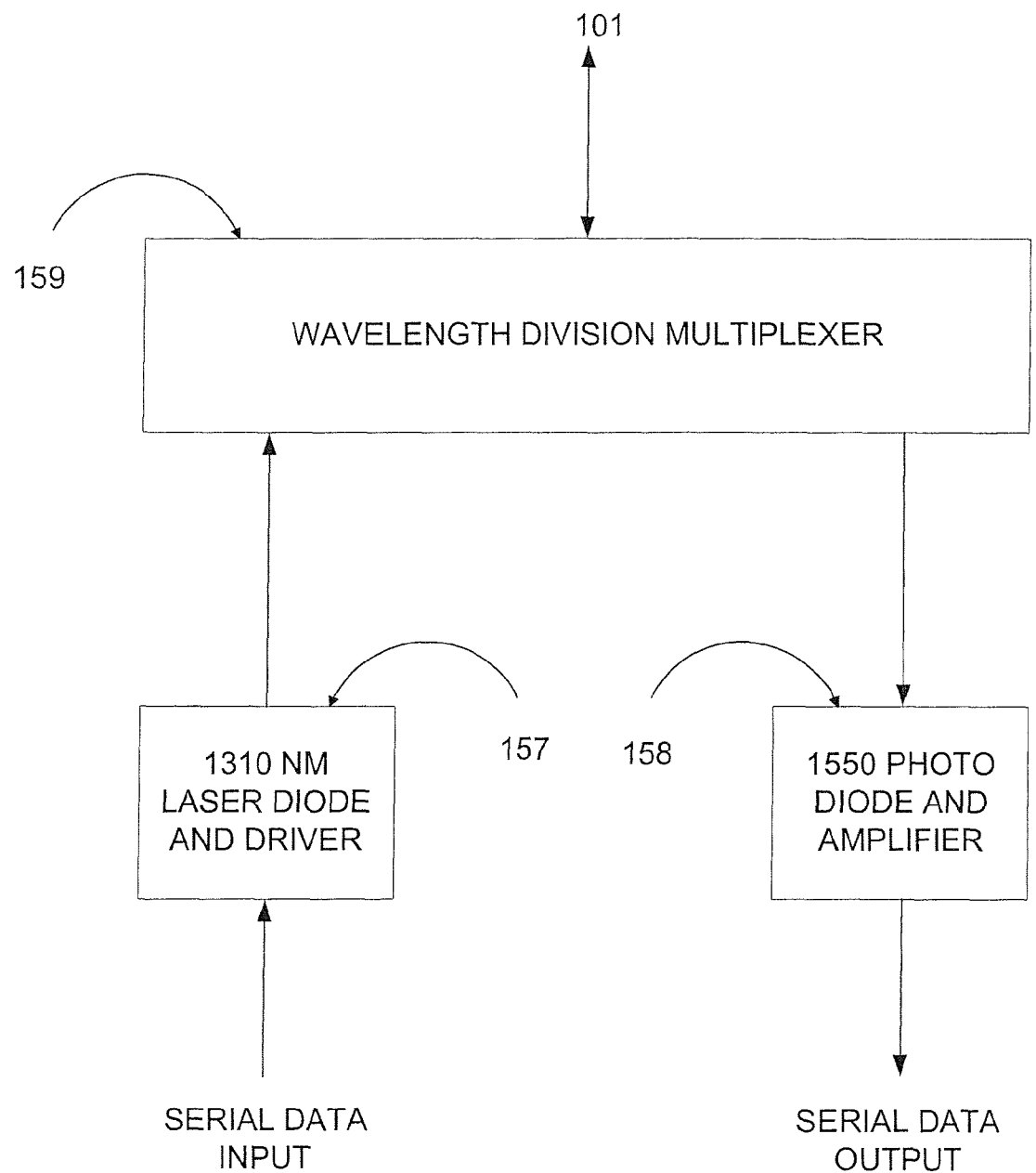
FIGURE 5: 1310/1550 FIBER OPTIC TRANSCEIVER MODULE (125)

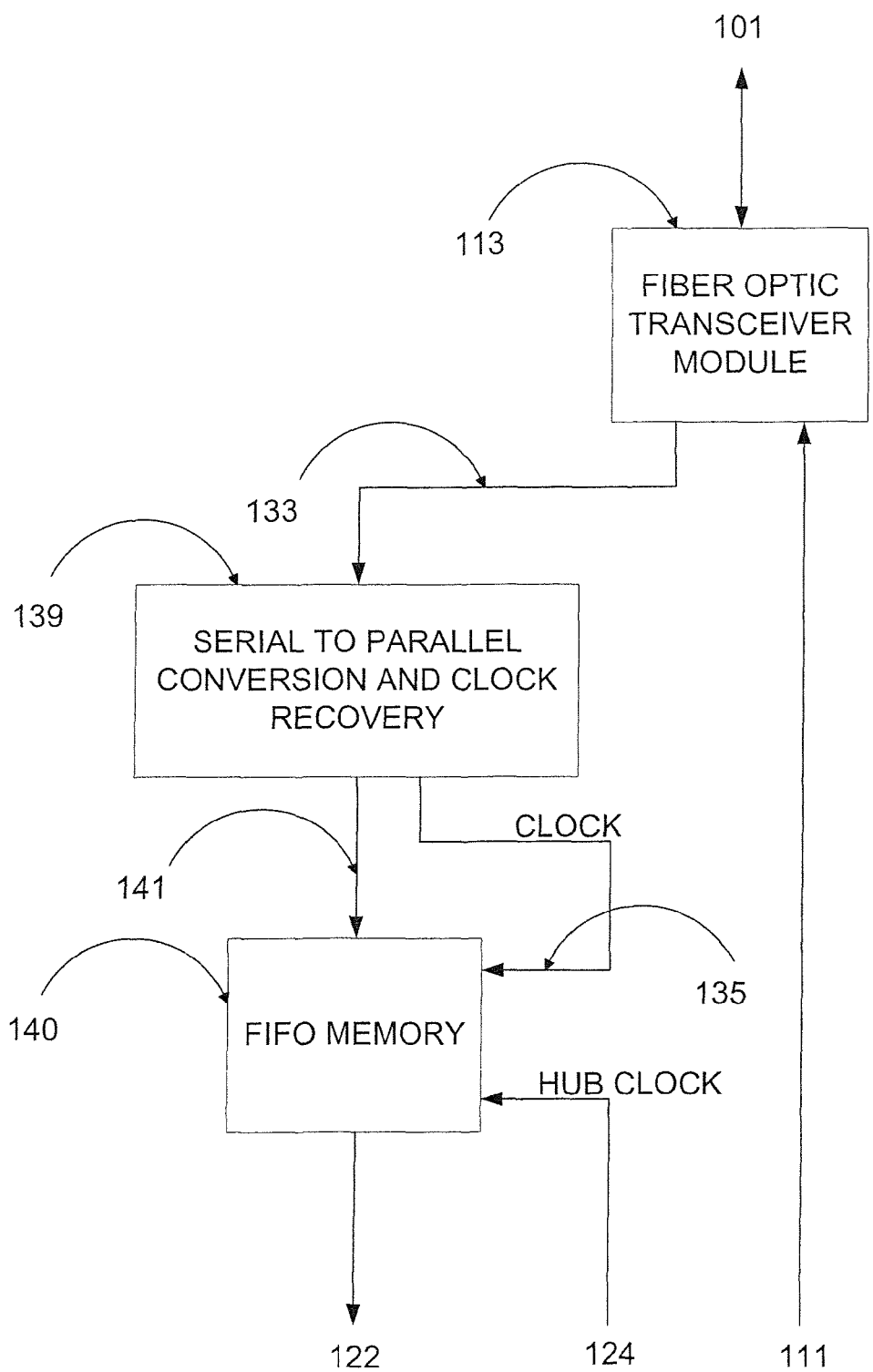
FIGURE 6 HEAD INTERFACE MODULE (123)

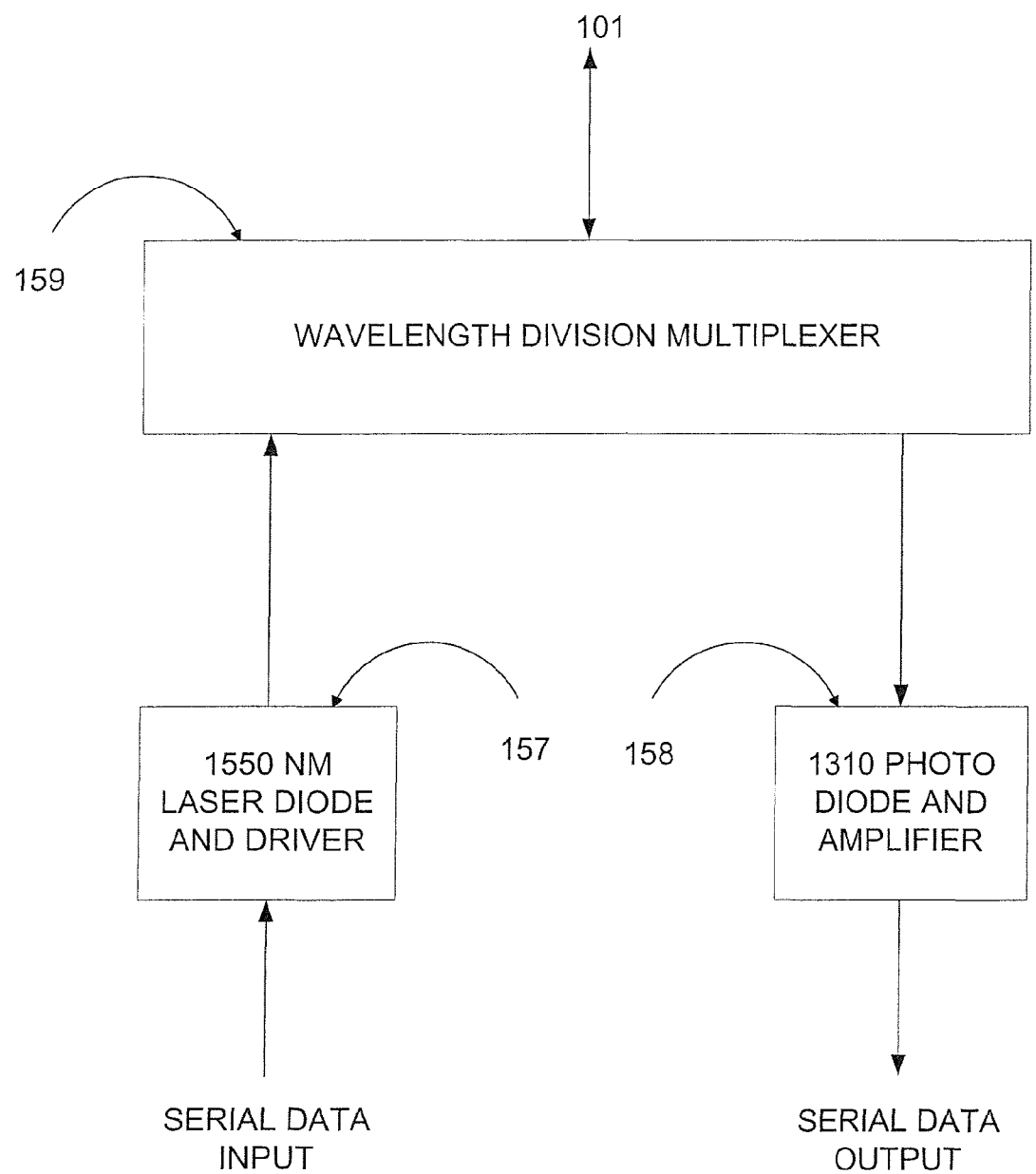
FIGURE 7: 1550/1310 FIBER OPTIC TRANSCEIVER MODULE (113)

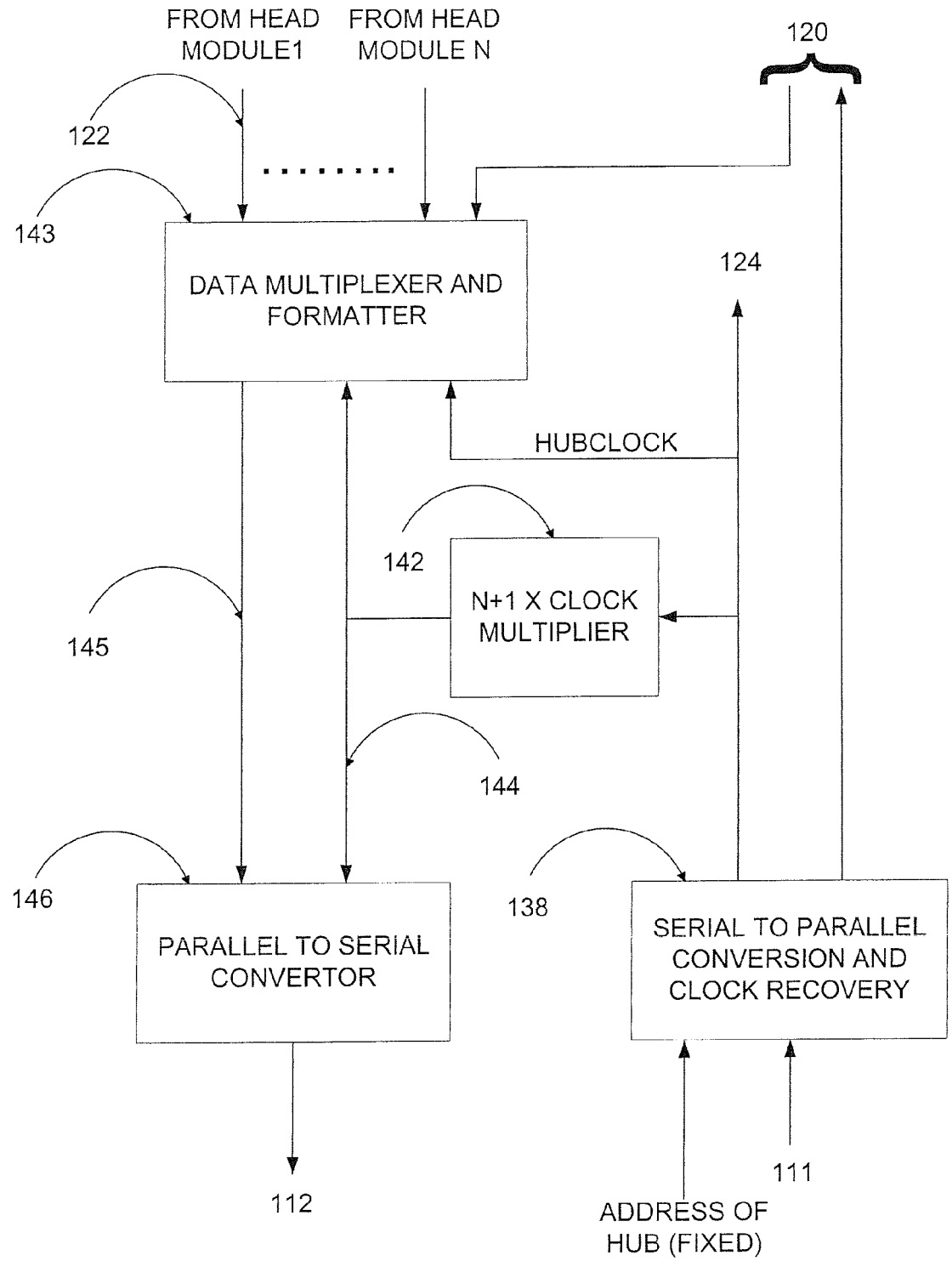
FIGURE 8: HUB VIDEO, DATA AND STATUS PROCESSING (119)

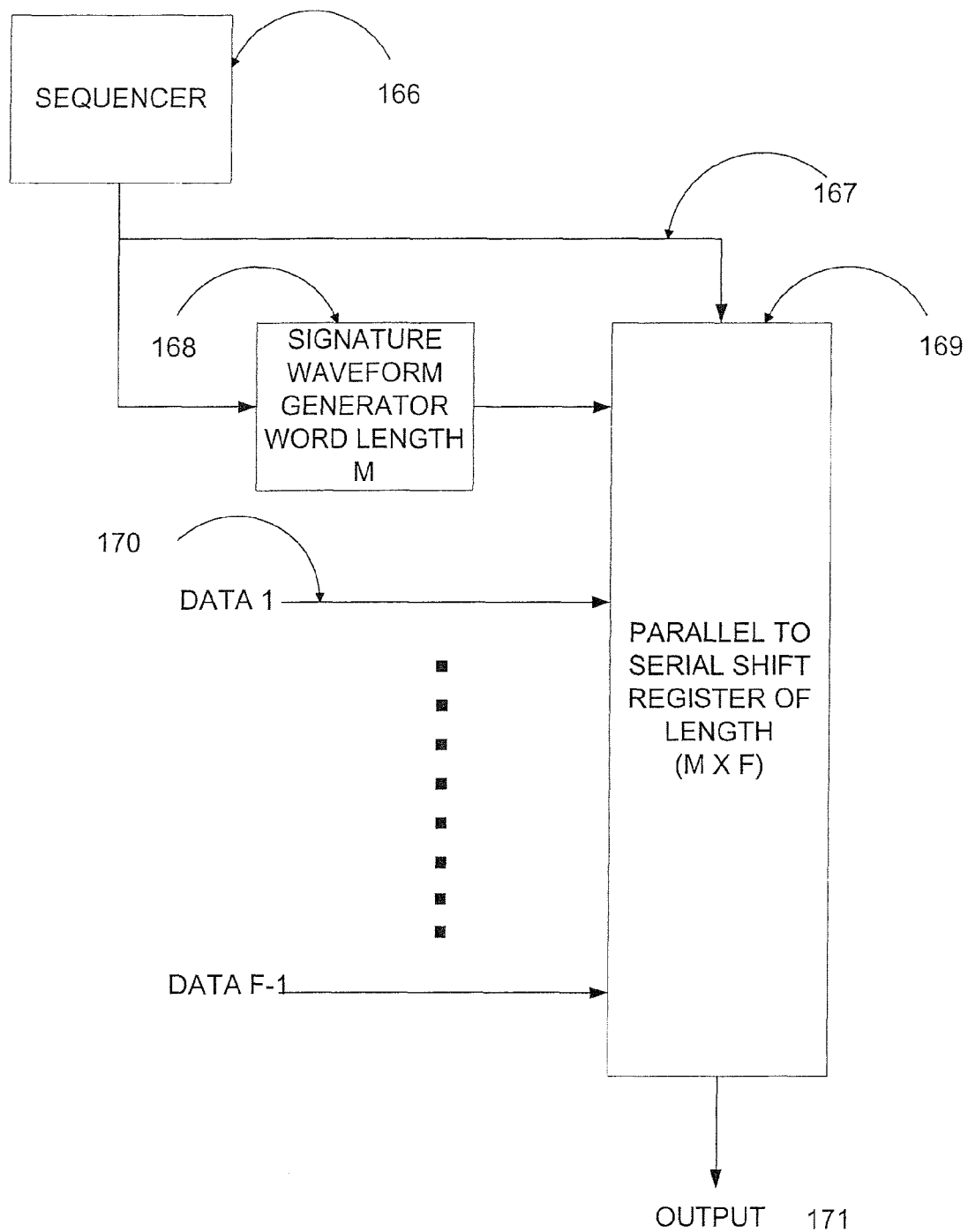
FIGURE 9: PARALLEL TO SERIAL CONVERTOR 146

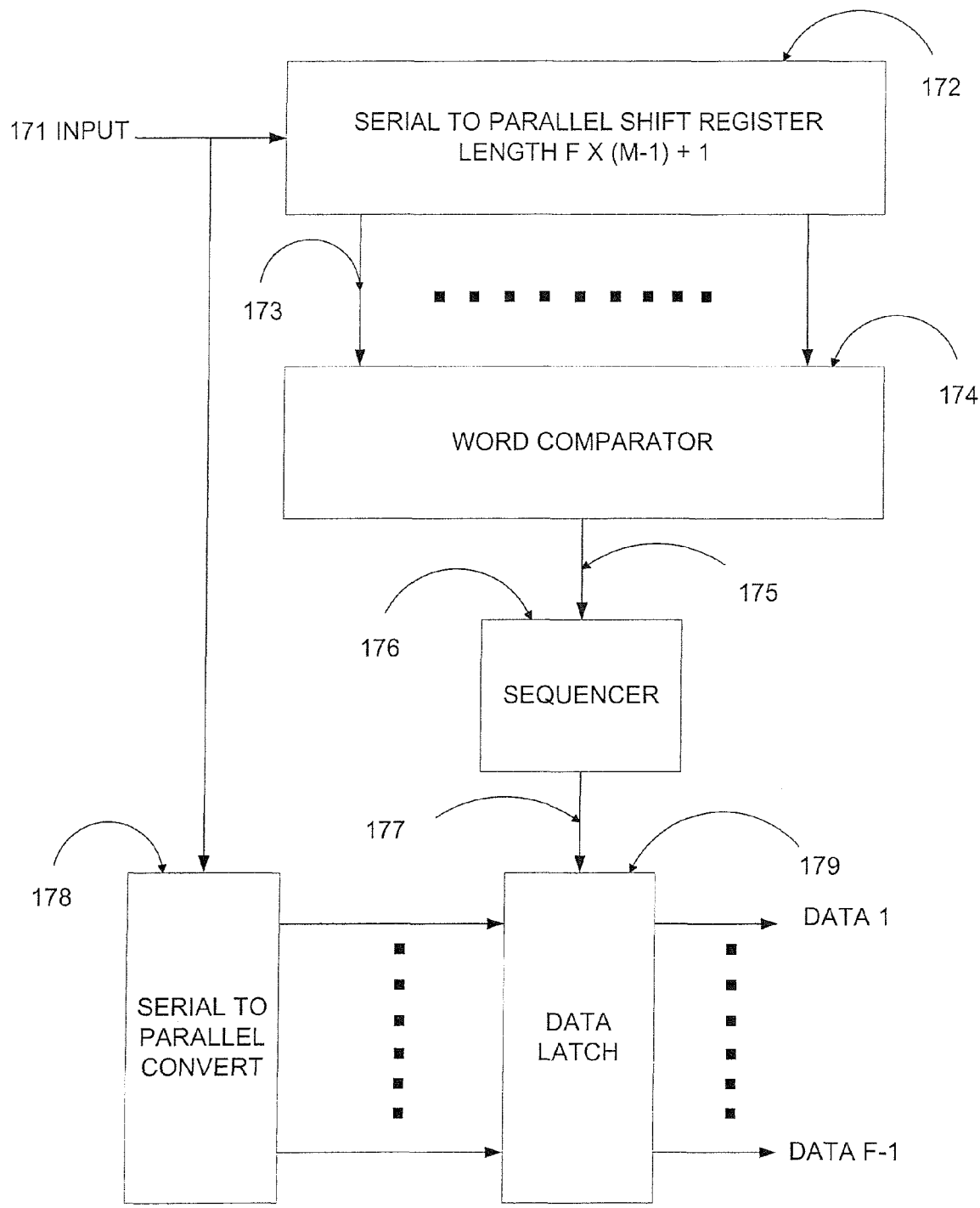
FIGURE 10: SERIAL TO PARALLEL CONVERTOR 152

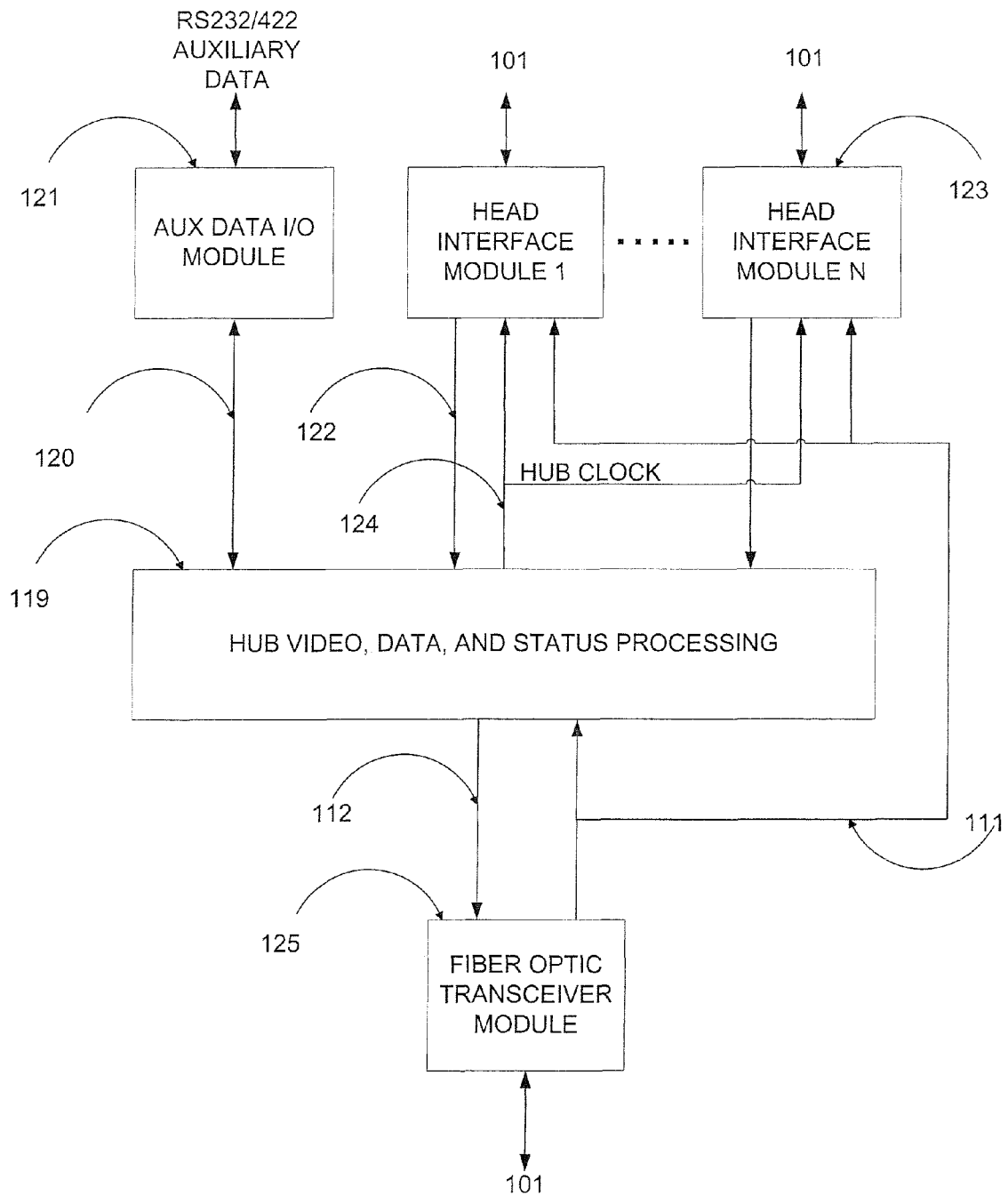
FIGURE 11: HUB (102)

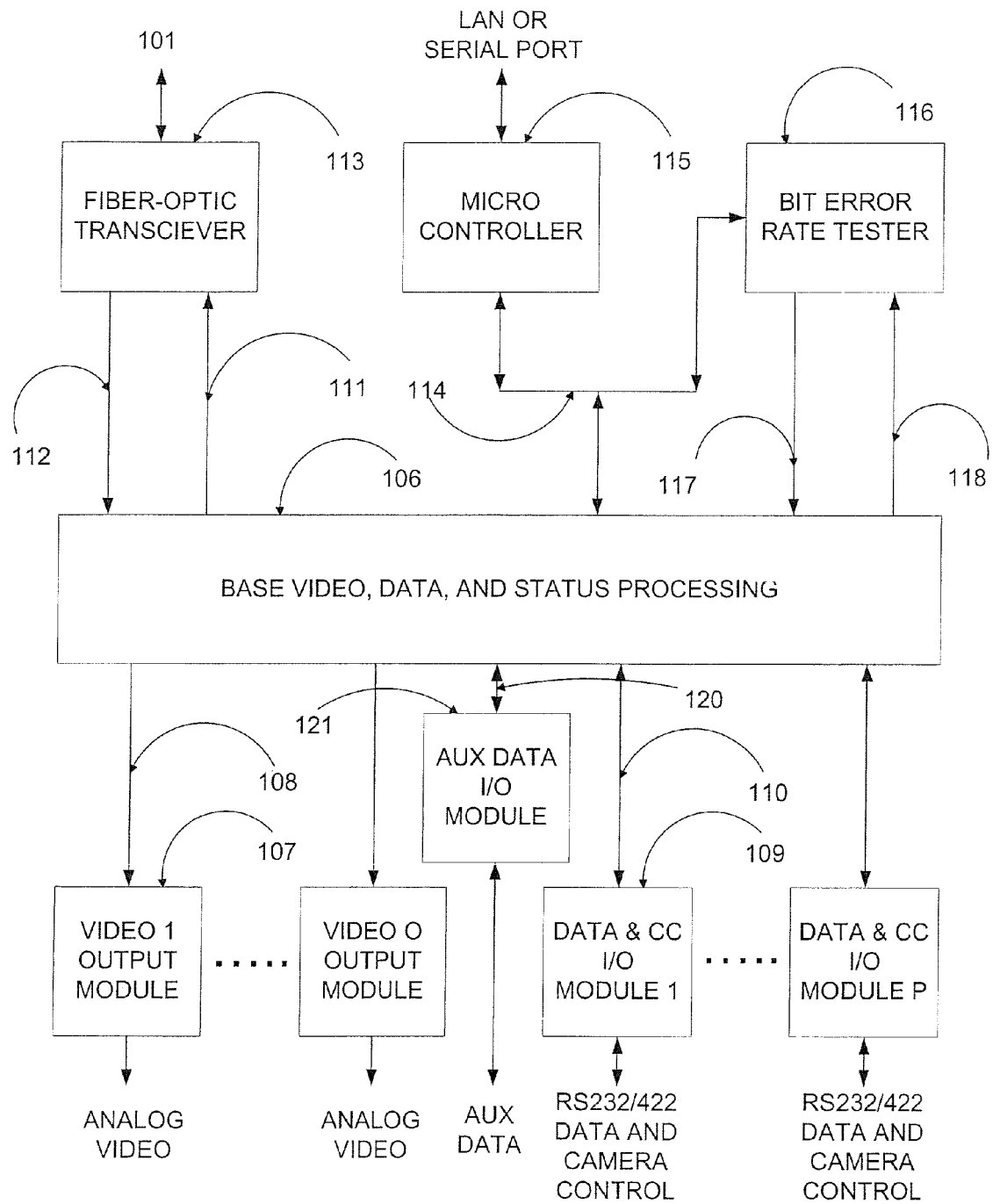
FIGURE 12:    BASE (100)

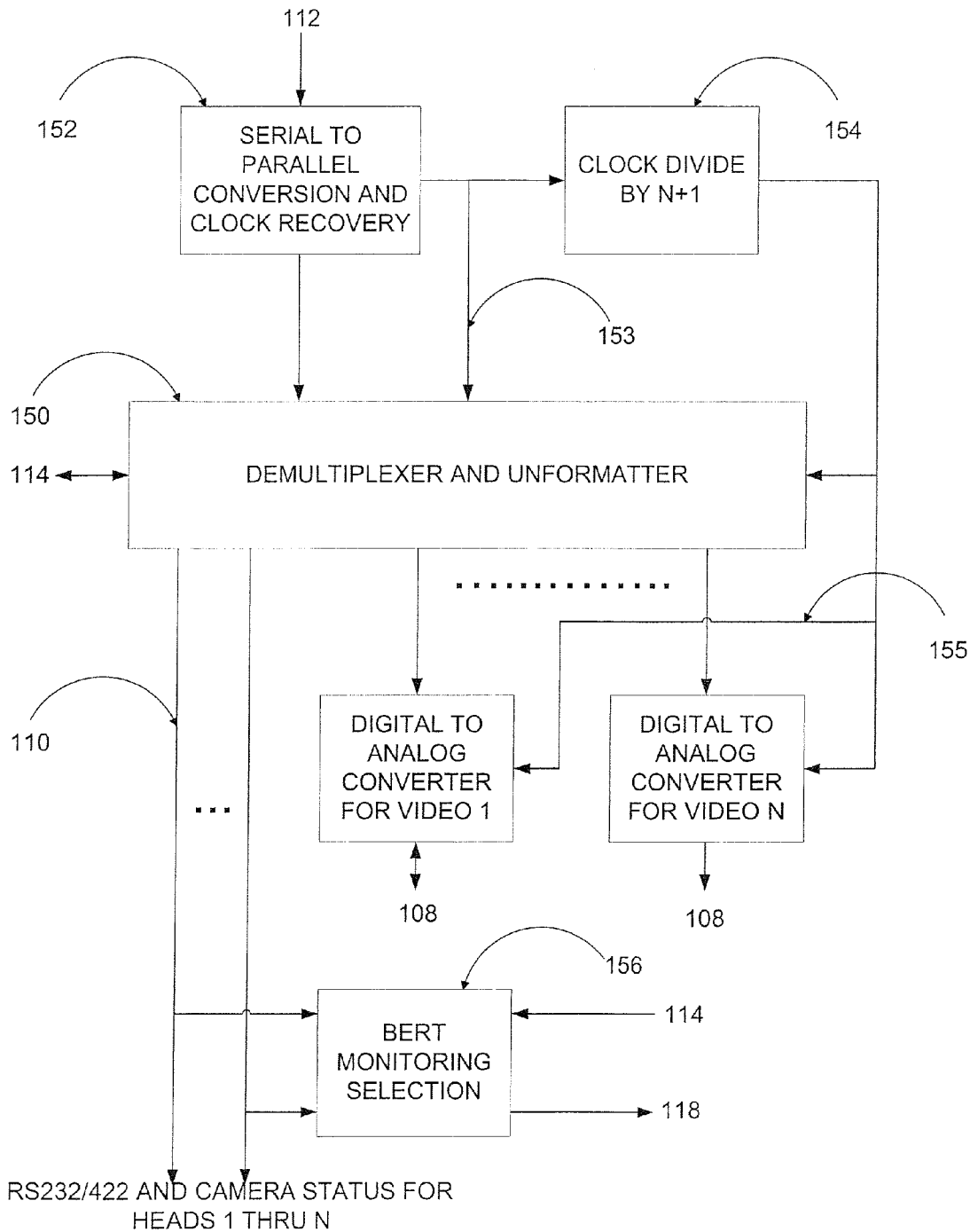
FIGURE 13: BASE VIDEO, DATA AND STATUS PROCESSING (100), DOWNLINK SIDE

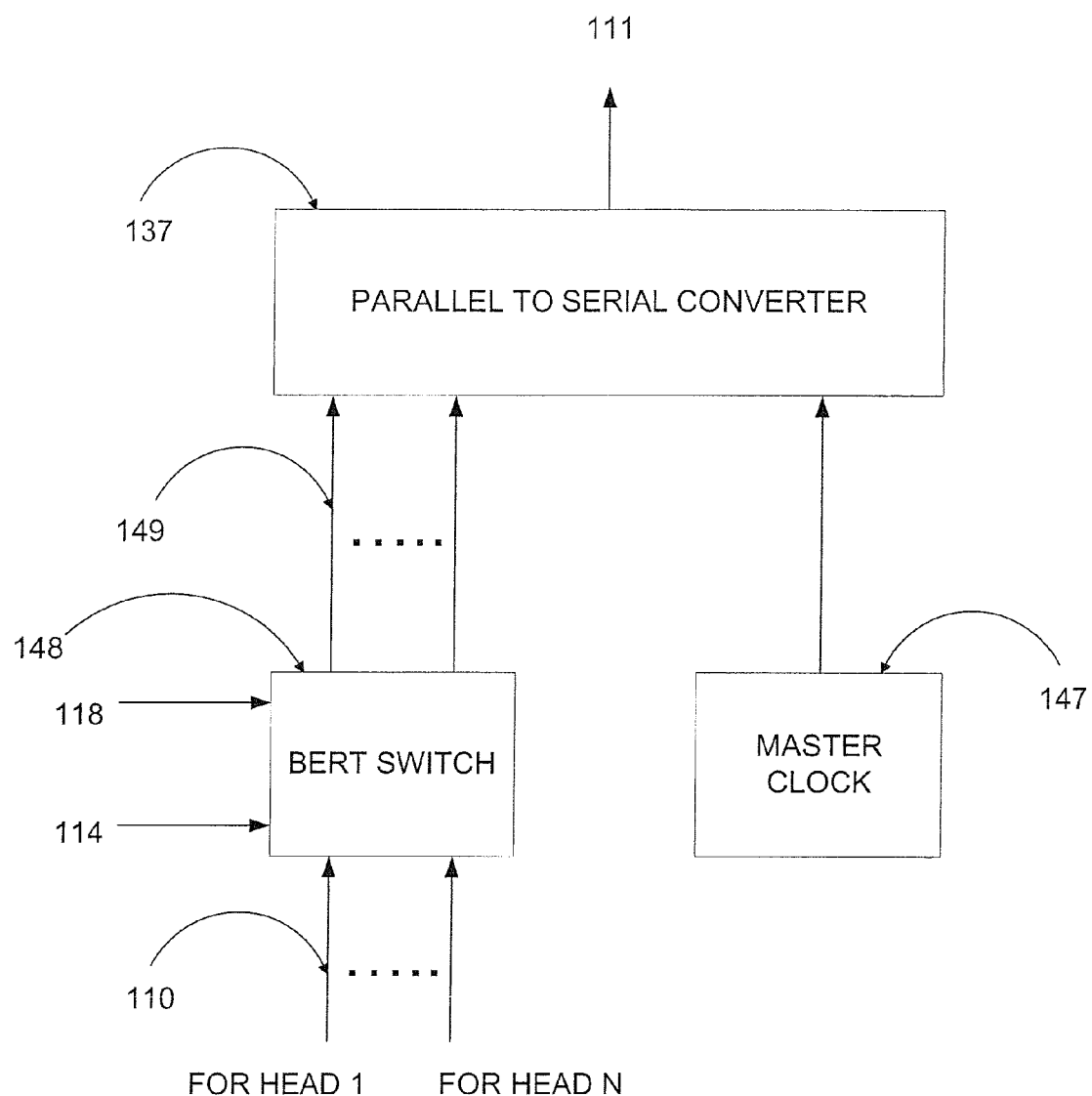
FIGURE 14: BASE VIDEO, DATA AND STATUS PROCESSOR (100), UPLINK SIDE

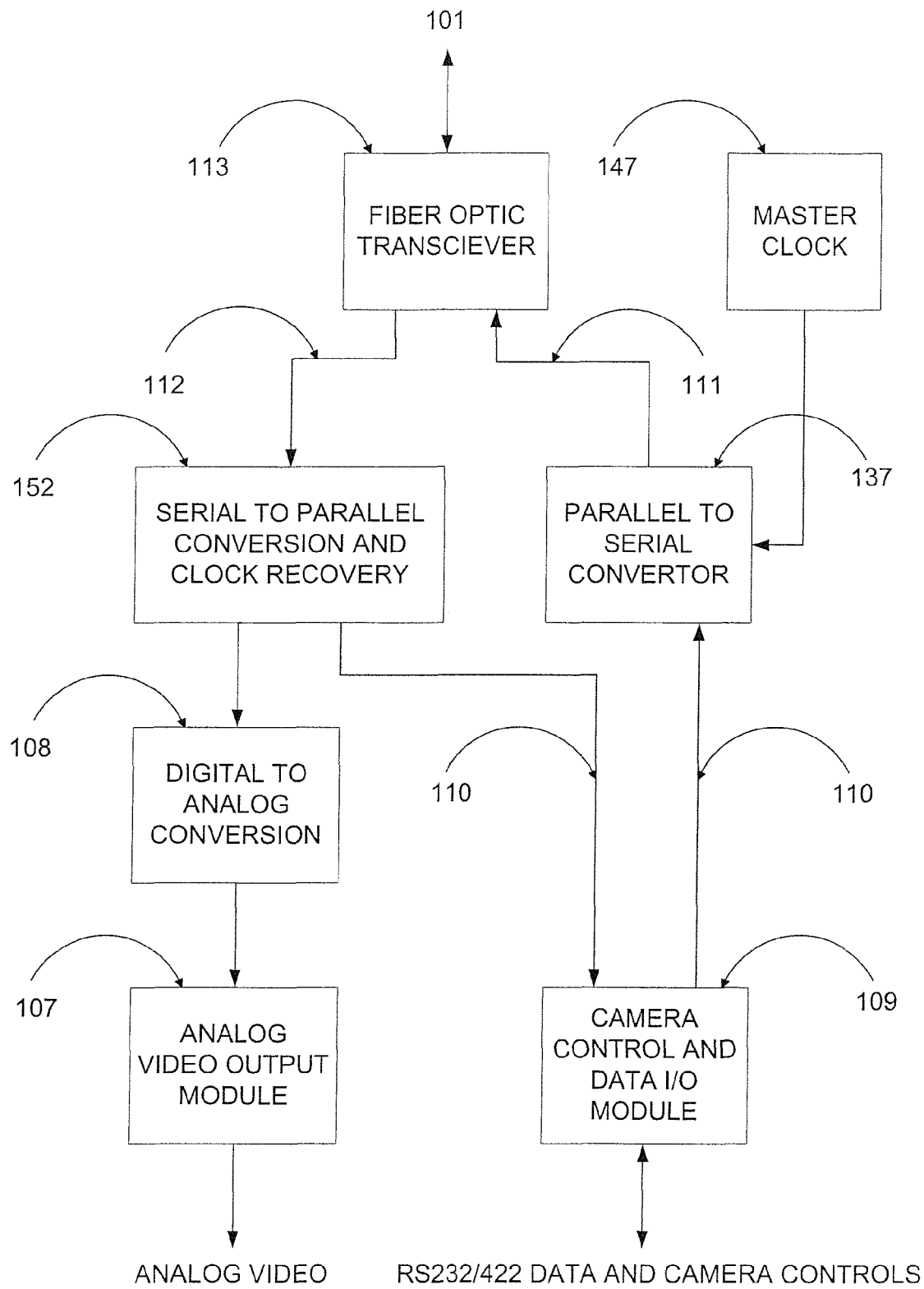
FIGURE 15: SINGLE CAMERA SYSTEM BASE UNIT (165)

SYSTEM FOR COMMUNICATION OF VIDEO, AUDIO, DATA, CONTROL OR OTHER SIGNALS OVER FIBER

CROSS-REFERENCE TO RELATED APPLICATION(S)

This application is a continuation of U.S. application Ser. No. 11/056,466 filed on Feb. 11, 2005, the disclosure of which is incorporated herein by reference. U.S. application Ser. No. 11/056,466 claims the priority of U.S. Provisional Application Ser. No. 60/544,140, filed on Feb. 12, 2004, the disclosure of which is incorporated by reference herein.

FIELD OF THE INVENTION

The present invention relates generally to communication systems, and more particularly to surveillance or broadcast video systems, or other types of systems for communicating video, audio, data, control or other signals over fiber.

BACKGROUND OF THE INVENTION

In conventional surveillance and broadcast video systems, where many analog video sources are required to be combined or multiplexed for transmission over a single link, whether it be fiber or copper cable, the video inputs to the combining device typically have to be in analog form. The conversion from analog to digital is done inside the combining device, where the analog to digital converters can each be clocked by the same clock edge. This is shown in FIGS. 1C and 1D.

It will be evident to one skilled in the art that in order to combine, interleave or otherwise multiplex digital signals, into a single stream, the digital samples or in this case, pixels, must be precisely aligned in frequency and phase, as each sample must occupy a predetermined position in the stream. This necessitates that the analog to digital conversion for each signal to be multiplexed must be done at the same physical location with the same clock in order to minimize time skew between the digital samples or pixels, of each conversion. The requirement that the multiplexing device have analog inputs also imposes other restrictions, such as that the sources must not be more than approximately 30 meters from the multiplexer, in order to minimize high frequency roll-off due to cable losses. Connecting the sources to the multiplexer via coaxial or twisted-pair cable has other disadvantages, such as the size and weight of the cable, or problems arising from having a direct electrical connection between source and multiplexer. Some applications may require complete electrical isolation for safety reasons.

One may try to circumvent these problems, if long distances or electrical isolation are required, by using a fiber optic link to connect the video source to the multiplexer, but this link would either have to be analog intensity or FM modulated, which can introduce noise or distortion, or convert the video to digital form and then back to analog again, for input to the multiplexer, which is expensive and involves extra conversion processes which can also introduce noise or distortions. Some multiplexers do accept digital inputs, but if the sample rate of the source differs in frequency from the master clock frequency of the multiplexer, a FIFO frame buffer memory is required for each input. This is needed to change the frequency and phase of the source's digital samples to those of the multiplexer. But it can add greatly to the cost. This memory will also cause frames of video to be either dropped or repeated, depending on the relative frequencies of the input and master clocks, in order to prevent the memory from overflowing or underflowing. This repeating or dropping of frames can cause motion artifacts in the video image. A smaller, less expensive FIFO cannot be used because underflow or overflow would occur more rapidly, and would necessitate the dropping or repeating of individual pixels within a video frame, which would be more visually upsetting to the user, and cause a loss of synchronization in the video monitor, because the length of the video frame would be altered by the repetition or dropping of pixels.

Still other system designs may circumvent this problem by keeping the video in digital form, but packetizing it in asynchronous transmission protocols that add extra code words and/or start/stop bits to the transmitted stream that allow the data to be recovered by a receiver whose clock is not referenced to the source. This adds overhead in the form of increased bandwidth requirements for the communications link, complexity and cost. The increased bandwidth requirements can be addressed by resorting to video compression, but this can result in loss of quality, which can be in the form of motion artifacts or loss of fine detail in the image. This can be a disadvantage in a surveillance system when one is trying to capture an image such as a face or a license plate number. There is also the increased cost resulting from the compression and decompression circuitry.

Conventional surveillance or broadcast fiber optic video links also lack a built-in video test signal generator with multiple patterns at the source for performance verification and various system alignment tasks. Often, if a test signal is present, it is usually within the source itself, and limited to one pattern such as color bars. This is insufficient for all the tests that might need to be performed on the system.

An example of a conventional system is given in FIGS. 1C and 1D. The increased system complexity and additional wiring and interconnects are shown. The video, audio and data signals originate at the camera 105 in analog format and are interfaced to the fiber optic transmitter 202 via electrical cables 104. The traditional fiber optic transmitter 202 interfaces with a fiber optic cable 101 to a fiber optic receiver 203. The receiver decodes the video, audio and data signals from the digital domain back to the analog domain. A plurality of fiber optic receivers interface to a video and audio multiplexer 207 and a data multiplexer 201 via a complicated cabling arrangement including video cables 206, audio cables 205 and data cables 204. In most applications the data multiplexer requires at least two fiber optic cables 200 for the data transmission. The video and audio multiplexer requires a third fiber optic cable 101. The control room or receive end of the conventional system requires a video and audio demultiplexer 100 and a data demultiplexer 208.

Current systems also exhibit significant latency between the video image and the camera pan, tilt and zoom controls. Due to the latency, the user has difficulty controlling the pan, tilt and zoom functions of the camera system. The user executes a command to move a camera, but the system exhibits significant delay before movement is preserved on the video monitor. The latency causes the user to overcompensate all camera movements.

As is apparent from the foregoing, a need exists for an improved fiber optic communication system, suitable for simultaneous transport of multiple broadcast or surveillance video streams from distant sources, that is able to maintain a digital format, but in uncompressed form, from input to output, and that can provide a means for testing and performance validation as well as source identification.

SUMMARY OF THE INVENTION

The present invention overcomes one or more of the above-noted problems by providing, in an illustrative embodiment, a system for real-time bidirectional communication and control of a plurality of remote devices, such as video cameras, and which also combines video, audio and data signals from such sources into a single stream for transmission over a single link for separation and display at the receiving end.

More specifically, the illustrative embodiment provides a high-speed serial digital communication and control system, and corresponding methods of operation, suitable for use in surveillance, broadcast or other applications. This embodiment allows real-time control of cameras or other input/output devices. The digital transmission of video, audio and data has more noise immunity and less distortion than conventional analog systems. Since this embodiment does not compress the digitized video, there are no motion artifacts or loss of image quality. The illustrative embodiment uses fiber optic cables which allow for an increase in the distance between remote units and the hub or base units, allows for easy mixing of different camera types, and provides the option of system expansion by adding additional remote interfaces and corresponding video sources. The present invention allows the simultaneous transport of a plurality of remote video sources.

One aspect of the invention is directed to an uncompressed visual, aural and control system using bidirectional high-speed serial digital transmissions. The system comprises three primary elements, namely, a plurality of remote interface units, or heads, a central hub, and a base unit.

Each remote interface unit accepts and converts analog video and audio signals into digital downlink data for transmission over its own fiber optic cable to the central hub unit. This remote interface also accepts digital data signals, if present, from its remote source, or an end user there, and combines these with the digital downlink stream that includes the above video. These data signals could also include status information, such as video present or uplink fail. Each remote head also receives, over the same fiber optic cable, digital uplink data and control signals from the hub which originated from the base, selects the data and/or control signals that are assigned to it, and outputs these to control the remote source and/or convey data to an end user there. Each remote head also has a programmable cable equalizer circuit, to compensate for long coaxial cable runs from the analog video source to the remote head. In this way, high frequency roll-off due to cable losses can be compensated for. The equalizer can be bypassed for short cable distances.

The central hub time-division multiplexes the signals from the plurality of remote interfaces into one downlink stream for transmission to the base over another fiber optic cable. It also receives, over the same fiber optic cable, uplink data and control signals from the base, and broadcasts these to the remote interfaces. The central hub can also input and output data signals for an end user located there.

The base unit separates the multiplexed downlink data and video signals from the remote interfaces that were combined and retransmitted at the hub into individual video, audio and data for output to individual interfaces, one associated with each remote interface, and accepts uplink data and control signal inputs at each interface, for combination via time division multiplexing into an uplink signal for transmission to the hub, where it will again be separated into individual uplinks broadcast to each remote unit. The base unit may also contain a microcontroller, which monitors the status bits recovered from the downlink stream. It also supervises the operation of a bit error rate test (BERT) unit. The microcontroller can be accessed by a TCP/IP link for remote monitoring of system health.

In addition to the combined data and control signals that are destined for the individual remote heads, the uplink stream from the base also has embedded within it, a master clock signal derived from a master clock source in the base. This is used to reconstruct a replica of the master clock in the hub and each remote head, so that all clocks throughout the system are frequency locked, and any videos that are digitized at the heads can be combined digitally at the hub and streamed to the base without the above-noted problems associated with clock frequency differences. There will still be a phase difference between the recovered clock in the hub and the clock associated with the data from any one remote head, due to path lengths from the head to the hub, but this can be accommodated by a very small, inexpensive FIFO memory which cannot underflow or overflow, in the manner described previously, because the input and output clock frequencies are now the same. Thus, the video can be kept in digital format and transported and recovered with little or no overhead because the system is completely synchronous.

The uplink stream also has embedded within it, reference signals that enable each remote head, and the hub, to locate within the stream the uplink data and control signals destined for it. In this way each head can be accessed individually and simultaneously. Each head can be programmed to capture data and/or control from any one of the interfaces at the base. The streams uplinked from the base to the hub, and from the hub to the heads are all identical (i.e., they are the same signal). This has the advantage of allowing an individual head to be moved from port to port on the hub without having to reprogram that head, unlike other systems, which may assign a remote head to one hub port only.

The uplink stream also contains command words to enable the built in test signal generator in each remote head, and to select, for example, one of 15 test patterns contained therein. In this way, tests for frequency response, signal to noise, linearity, differential phase and gain, and others can be carried out on the system. Command words to enable and program the character generator and voice identifier are also available.

The system is designed to be completely transparent to any serial data protocol that the user may choose to input or output from the various data interfaces on the base unit, hub, or remote interfaces, as long as the data has a baud rate of less than B MHz. This is because the user data is handled in much the same way as an analog signal, converted to digital by feeding it to a 1-bit analog to digital converter with a sampling rate of C MHz. In this case, however, the analog to digital converter is actually a comparator whose threshold is programmed to be compatible with standards such as RS232, RS422, RS485, and others. The output of the comparator is sampled by a flip flop with clock frequency of C MHz. Slicing the signal up in this way enables it to be time division multiplexed with other data streams in much the same way as the video signals, so that it can be transported simultaneously over a single fiber with other multiplexed signals. The uplink and downlink data streams have reference signals embedded within them so that the data and video components can be demultiplexed at the other end and routed to the proper destinations. The reference signal is added to the composite data signal after the multiplexing has been carried out; i.e., it is not added to any of the user signals themselves before the multiplexing process.

The system can handle control protocols for a multiplicity of camera types, because it is transparent to them. Unlike other systems, the system in the illustrative embodiment does not require a microcontroller or any other form of software, firmware or intelligence to manage user data or prior knowledge of the protocol of that data in order to packetize it or to add signal management content to it, such as address bits, data type bits, start and stop bits, so that it can be routed to, and extracted by, a specific location. The time-division multiplexing of the raw user data and the broadcast nature of the uplink and downlink multiplexed data combined with a reference signal for time-division demultiplexing and extraction of data by the intended destination, ensures a simple, low cost, transparent means of data communication. It will be apparent to anyone skilled in the art that, except for the bit-error rate testing and system health monitoring functions, the illustrative embodiment may be implemented as a completely "hardware-based" system, although numerous other implementations are possible using various combinations of hardware, software or firmware.

Each of the data interfaces on the base unit can have a test signal from a BERT unit substituted for the user inputs. This testing is done under control of a microcontroller. This microcontroller is only used for error rate testing, and is not needed for the normal operation of the system. The uplink data stream has a command word which, when asserted, would then command the remote head to loop back this data into the downlink stream where, at the base, the received data would be input to the BERT unit for comparison to what was sent.

Another embodiment comprises a system where only a single remote source need be monitored and controlled. This embodiment is identical except that there is no central hub for connecting a multiplicity of remote interfaces to the base unit; instead the single remote interface connects directly to a simplified base unit, which has only one user data and control input/output interface, one video output port, and no BERT or remote system health monitoring. In this embodiment, the data and video are not multiplexed, and there are thus no reference signals added to enable extraction from a multiplexed stream. The remote head in the single interface system, however, is identical to those in the multi-interfaced system, and has all of the capabilities and functions of those heads, which can easily be enabled should system expansion to a multi-interface system be required.

BRIEF DESCRIPTION OF THE DRAWINGS

FIG. 1B is a block diagram or the remainder of the overall system showing the base unit.

FIGS. 1C and 1D show a typical conventional system.

FIG. 2 is an overall block diagram of the single camera embodiment.

FIG. 3 is a detailed block diagram of the remote interface head.

FIG. 4 is a more detailed drawing of the video and data processing in the head.

FIG. 5 is a drawing of the downlink fiber optic transceiver module.

FIG. 6 is a detailed drawing of each hub to head interface in the central hub.

FIG. 7 is a drawing of the uplink fiber optic transceiver module.

FIG. 8 is a detailed drawing of the video and data processing in the hub.

FIG. 9 is a detailed drawing of a parallel to serial conversion with reference signal insertion.

FIG. 10 is a detailed drawing of a serial to parallel conversion using a reference signal.

FIG. 11 is an overall block diagram of the hub.

FIG. 12 is a more detailed block diagram of the base.

FIG. 13 is a more detailed drawing of the downlink video and data processing in the base.

FIG. 14 is a more detailed drawing of the uplink video and data processing in the base.

FIG. 15 is a block diagram of the single-camera base unit.

DETAILED DESCRIPTION OF THE INVENTION

Figure 1A:
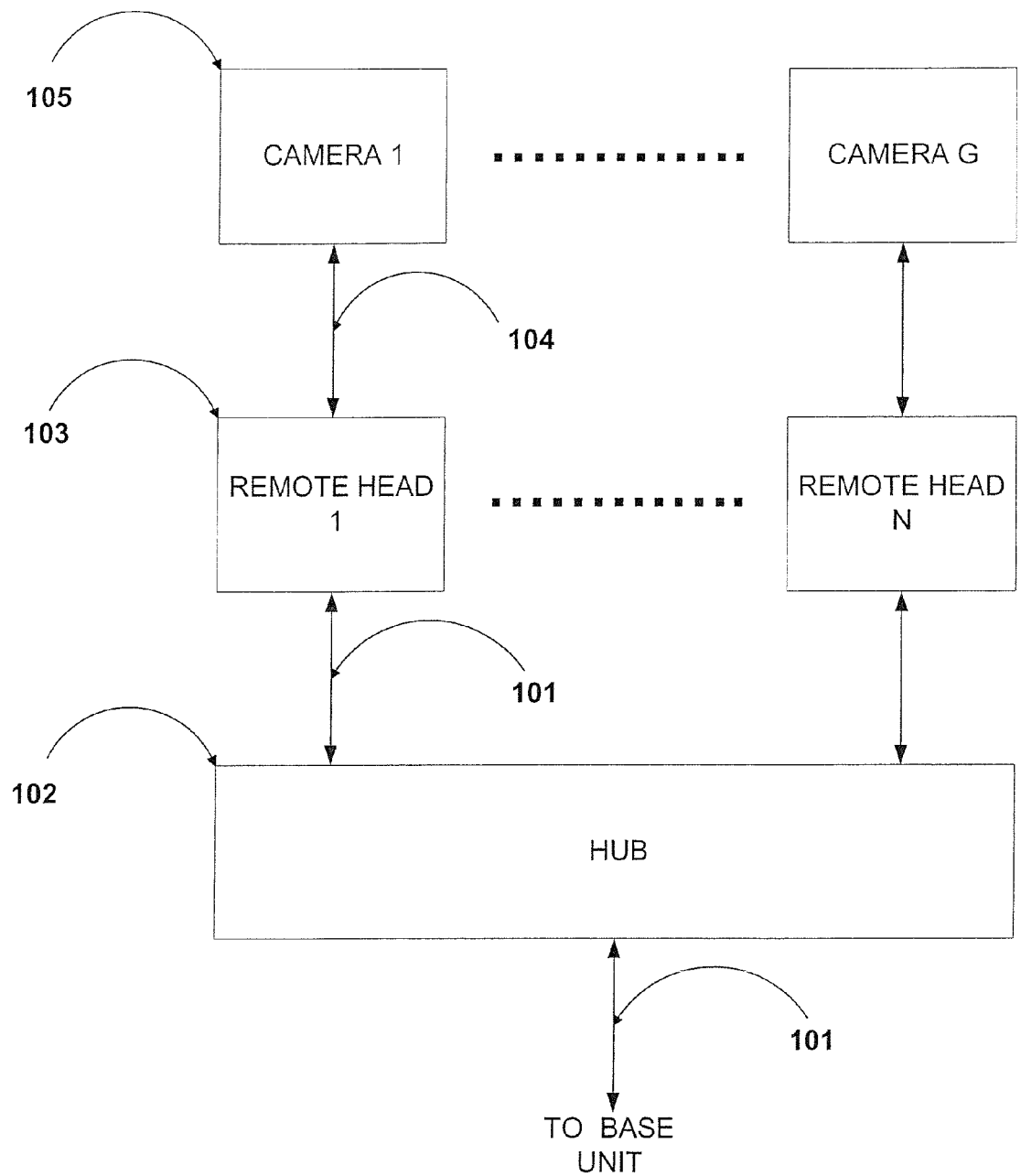
FIG. 1A is a block diagram of part of the overall system showing multiple remote interfaces and the central hub.

The present invention in an illustrative embodiment to be described below provides a system for multiplexing and digital transmission of signals from remote video sources, such as cameras, bidirectional audio, and for bidirectional digital serial communication and control of these remote sources, such as camera pan/tilt/zoom, over fiber optic cable, for surveillance, broadcast television, or other applications. It is to be appreciated, however, that the invention can be implemented in a wide variety of other system configurations, in order to meet the particular needs of a given application.

The system can be configured as multiple remote video interfaces, which connect each camera or other video source, via a single fiber optic cable, over a distance of many kilometers (e.g., up to 20 kilometers or more), to a central hub. Up to N remote interfaces can be accommodated, where N and other variables referred to herein are arbitrary numbers that can take on any desired values, within the practical constraints of a given implementation. The central hub, in turn, is connected by another single fiber optic cable, to a base unit, which can be located many kilometers from the hub. Analog video and audio from the source is digitized and passes from each remote interface to the hub, and bidirectional data and control signals pass to and from each remote interface device and the hub.

The hub combines these video, audio and data streams from the remote interfaces into a single stream so that the video, audio and data from each remote interface can be sent simultaneously to the base unit, and data and control signals destined for each remote interface can be sent to the hub and separated for transmission to each remote unit.

The base unit separates and converts the video and audio signals from the remote interface that were combined at the hub into standard analog format, and these signals are each available simultaneously on separate outputs. Likewise, it separates the data and signals from each remote interface that were combined at the hub and makes these available simultaneously as standard serial digital interfaces, in protocols such as RS232, RS422, or RS485, selectable by the user. As these interfaces are bidirectional, the base also combines data and control signals input to them into a single stream for transmission to the hub, where they are separated for routing to each remote interface. The fiber optic links are bidirectional, allowing simultaneous passage of signals in each direction over the cable, using a different wavelength for each direction. For highest possible quality, the video is transported in uncompressed form.

The remote interface units also include a video and audio test signal generator for testing and performance validation of the system. In the illustrative embodiment, up to 15 test patterns, plus normal video, can be selected from the base. The remote interface unit also includes a video character generator for the identification of the video feed. A voice recorder and generator are also incorporated into the remote unit for the purposes of identifying the voice or audio feed. The base unit also contains a BERT unit that can selectively substitute test signals for each of the data or control signals that are destined for the remote interfaces. The selected interface then loops these back to the base, where the BERT unit can verify performance of the data and control paths. The data from the remote interfaces and hub include system status signals, such as video present or loss of data, and these plus the BERT test results can be made available to a remote location via a TCP/IP link or other type of connection. When a system failure occurs, the above mentioned test signal generator, character generator and voice identifier can be enabled to aid in diagnostics. If a camera or input/output source should fail, the system can identify the failure with the visual character generator or the aural audio identifier. The base unit includes a video and audio analyzer to measure and quantify video and audio quality and performance.

The inclusion of a video character generator and voice recorder permits the identification of the video and audio feeds at the source. In the provisioning of large systems it becomes difficult to document and verify the origins of video and audio feeds. It also becomes very difficult to diagnose and locate system errors. The test signal generator, character generator and voice recorder are very useful for verifying circuit continuity, testing performance and general trouble shooting as mentioned above. The character generator can provide a visual alarm or error status in the video picture. The audio identifier can provide an aural alarm or error status in the audio or voice channel.

In instances where only a single remote video source need be accommodated, the central hub can be eliminated, and a simplified base unit can be provided which supports just a single remote interface unit.

Using coarse and dense wave-division multiplexing technology can increase the capacity of the system. Many systems can share the same fiber optic infrastructure using this technology.

In the present embodiment, shown in FIGS. 1A and 1B, the system has a central processing hub 102 which is connected to a plurality of up to N remote interface units 103 via fiber optic cables 101. These remote interfaces are connected to imaging devices such as video cameras 105 via copper cables 104 such as coaxial cables through which analog video signals are transmitted to the remote interface units. The cables 104 also include other connections through which control signals, such as camera pan, tilt, and zoom, are transmitted to the imaging device. The remote interface can also accept and output data signals including but not limited to RS232, RS422, or RS485. The central hub 102 connects via another fiber optic cable 101 to a base unit 100, to which up to I analog video monitors 160 can be connected via coaxial cable 162. Each monitor is associated with a corresponding remote interface device 103 and the imaging device 105 connected to it. The base unit also has up to J data interface ports which connect, via copper cables 163, using protocols including, but not limited to, RS232, RS422, or RS485, control units 161 which may include, but are not limited to, devices such as joysticks or other devices for camera positioning and control. A subset of the present embodiment is a single camera or video device embodiment shown in FIG. 2. This will be described later.

Figure 1C:
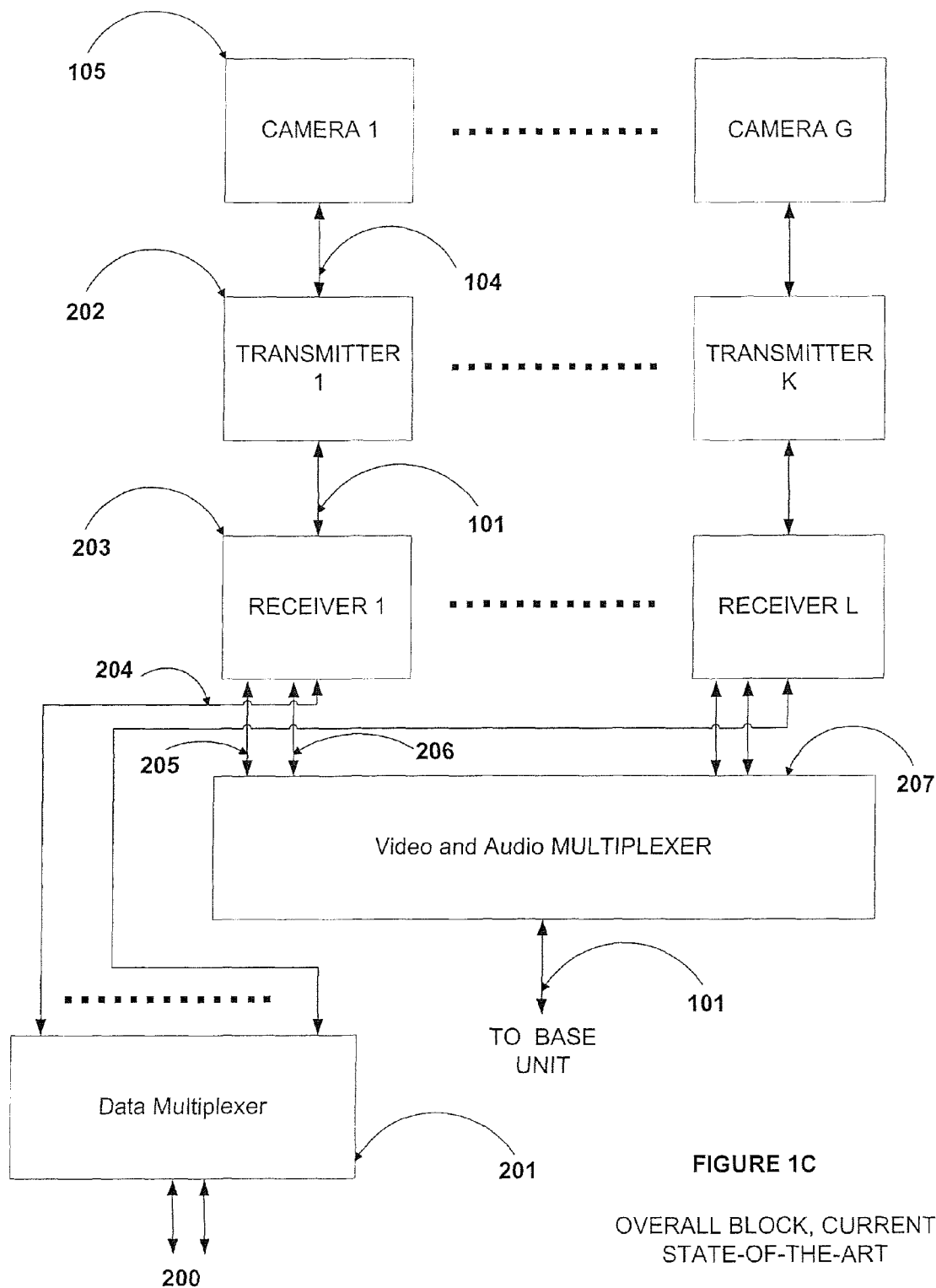

Advantageously, the hub unit 102 in the illustrative embodiment of the invention replaces numerous conventional elements such as the plurality of receivers 203, video and audio multiplexer 207, data multiplexer 201 and all the interconnection electrical cables 204, 205 and 206 of FIG. 1C. This allows all video, audio and data signals to be maintained in the digital domain. The signals are kept synchronous and uncompressed with minimal latency. No electrical connections are required. This embodiment requires only one fiber connection from each remote head 103 to the hub 102, and one fiber connection from the hub to the base unit 100, thereby further reducing complexity.

The system in the illustrative embodiment drastically improves signal quality, integrity, timing and latency. For example, the system essentially eliminates all latency issues due to an uncompressed video and synchronous real-time signal transmission.

In describing the present invention, we will follow the path of the video signal from a typical imaging device 105 to its associated monitor 160. We will also follow the path of data input to the associated remote interface unit 103 to its associated data port on the base unit 100, and then from that port back up to the associated remote interface unit 103.

Referring to FIG. 3, the detailed diagram of the remote head 103, analog video from the camera or other imaging device which outputs standard RS170A or CCIR video, is fed to a cable equalizing device 134 that can be adjusted to negate the effects of high frequency roll-off and attenuation due to the properties of long lengths of standard RG11 or RG59 coaxial cables. The equalizing device is adjustable for cable lengths from 0 to E meters. This device also provides a means for selecting between balanced and unbalanced inputs. From the equalizing device, the video goes to a switch 129, that can be commanded via control lines 128 to select between the equalized video or a video test signal generator 130, which contains various video test images which can be used to test frequency response, linearity, differential phase and gain, and other parameters when used in conjunction with a test set connected to the corresponding video output at the base 100. One skilled in the art will be knowledgeable in carrying out such testing.

From the output of the video switch, the selected analog video is routed to an analog video input processing circuit 131, which contains an anti-alias filter, which is required for the subsequent analog to digital conversion. One skilled in the art will recognize the need for this filter. The input circuit also contains gain, frequency and phase adjustments to overcome any distortions produced by the filter. The test signal generator 130 can be instrumental in providing a signal of known quality against which these adjustments can be performed. The filtered video 132 is then routed to a processing module 127.

Referring to FIG. 4, a detailed diagram of the head processing module 127, the video 132 is routed to an analog to digital converter (ADC) whose output 136 is sent to a parallel to serial converter 137. This is necessary to convert the 12 bits per pixel output of the ADC into a serial stream, which is required for transmission over a fiber optic link. The parallel to serial converter also accepts four channels of digital data 110 as well as the ADC data 136. Thus, a 16-bit word is created for input to 137, which generates a serial word that is 20 bits long. The 20 bits consist of the 16 bits discussed earlier, plus 4 extra start and stop bits. The parallel to serial converter 137 and the ADC are both driven by a clock signal 135, which is extracted, from data that has originated at the base 100. We will discuss this clock 135 in more detail later. The converter uses a phase lock loop circuit to generate a clock that is equal to clock 135 multiplied by 20, which is used to clock out the serial word 133 to the fiber optic transceiver.

Referring back to FIG. 3, we see that the signal 133 goes to a fiber optic transceiver 125, shown in FIG. 5, to convert the digital 1's and 0's of the serial word output from 137 into pulses of light for transmission over fiber 101 to the central hub 102. We will discuss 125 in more detail later.

Referring to FIG. 6, which is a diagram of one of N circuits 123 in the hub 102 that connect to its corresponding remote head 103, we see that the fiber optic cable 101 from the head 103 connects to a fiber optic transceiver module 113, of the type shown in FIG. 7. This module differs from module 125, shown in FIG. 5, in the head 103 in that it is designed to transmit and receive on wavelengths that are complementary to those of 125. From 113 the serial data 133 goes to a serial to parallel conversion process 139, where the video and data are once again converted into parallel words. A clock signal 135 is also recovered from the data stream 133 by a phase lock loop circuit, which acts upon the start and stop bits that were inserted by the parallel to serial converter 137 in the head processing module 127. This clock is locked in frequency and phase to the data stream 133. However, although it will be locked in frequency to the hub system clock 124 as discussed above, it most likely will not be locked in phase to 124 because of the uncontrolled length of the fiber 101 which connects the remote head to the hub. It will be realized by one skilled in the art that the system cannot predict the length of 101; that quantity is determined by the end-user; and that this will cause the phase relationship of data sent through it to be random with respect to a reference. Because of this, a small FIFO memory 140 is required, as discussed previously. Data 133 clocked into the memory via clock 135 will be clocked out in phase via system clock 124 as data 122 that will now be in phase and frequency alignment with the system clock. As mentioned previously, it can now be multiplexed with the signals from the other remote heads for transmission to the base unit 100. Also, as explained above, the FIFO 140 need be only a few words in length because there is no possibility of underflow or overflow. It need only be long enough to accommodate any relative jitter between the input and output clocks, which is minimal in the present implementation.

Referring to FIG. 8, a detailed drawing of the video and data processing in the hub, the video and data signals, or channels 122 from each remote head, now aligned in phase as well as frequency, are fed to a data multiplexer and formatter 143, which performs a time division multiplexing function between the N channels. This circuit also embeds the data stream 120 from the auxiliary port on the hub. Since the time division multiplexing of the channels entails a faster data rate, the clock 144 used to drive the multiplexing process and the parallel to serial converter at this faster rate must be generated from the main clock 124 by a clock multiplication scheme 142 such as a phase lock loop circuit. One skilled in the art will be familiar with this technique. The time division multiplexed data 145 is fed to a parallel to serial conversion process 146. This is similar to the process 137 in the remote head except that the conversion is carried out at a much higher data rate due to the N-fold increase in the amount of signals to be transported, and due to the fact that an additional signal must be embedded to enable the processing circuit in the base unit 100 to separate the time division multiplexed channels so that each can be routed to its correct destination. The resulting signal 112 is fed to a fiber optic transceiver module identical to 125.

Referring to FIG. 9, a more detailed diagram of the processes contained within 146, we see that besides a shift register 169 to convert the incoming parallel data 170 into a serial stream 171, there is a signature word generator 168 and a sequencer 166. The signature waveform is inserted into the serial stream 171, along with the data channels by the shift register 169 in a predetermined order controlled by the sequencer 166. The signature waveform serves much the same function as start and stop bits would in an ordinary parallel to serial conversion process, with the exception that it takes up only a single time division multiplexed slot in the resulting transmission word, compared to 2 or more positions for conventional start and stop bit techniques, thus saving bandwidth requirements. Unlike start and stop bits, which can fail to be recognized reliably if the data to be transported assumes a pattern which mimics them, sometimes called a "pathological" signal, the signature waveform is designed to have a unique pattern of 1's and 0's with respect to commonly occurring patterns in the data channels 170, so that a receiving apparatus will be able to recognize it reliably. The signature word is typically in this case a long sequence of 1's followed by a long sequence of 0's, for a total of M bits. This word is time division multiplexed along with the F-1 data channel words, for a total of F words, so that a complete "frame" is F×M bits long. Thus, it will take F×M clocks to transmit the entire signature word. The diagram of FIG. 9 leaves out any clocks for clarity. The resulting signal 171 is designed to be fed into a shift register at the receiving end, of length F×M bits long, with taps at every F bits.

FIG. 10 shows a diagram of the receiving circuitry. The receiving shift register is shown at 172. The taps 173 feed a word recognition circuit 174, which will output a pulse 175 when the bits at the taps match the signature word. When the frame is clocked into this register, and the bits assigned to the signature word are at the taps, a pulse will be produced which serves as a reference point for determining which out of every F bits received, are the channels from the remote heads, and of these which is channel 1. This production of pulse 175 may be viewed as involving the use of a "matched filter," although other techniques could be used. In FIG. 10, this pulse 175 is used to reset and properly phase a sequencer 176. The incoming data 171, which consists of the time multiplexed video and data signals, is fed to a shift register 178 and latch 179, which together form the complement of register 169 in FIG. 14. The parallel data from 178 must be latched at 179 every F clocks at the proper time so that channel 1 appears at the same relative position at the output of 179 as it was fed into 169. The output of sequencer 176 produces a pulse every F clocks which causes the data to be latched at the proper time. The sequencer is reset every F×M clocks. The circuit 174 also has within itself another circuit that, once a pulse 175 has been output, prevents 174 from outputting another pulse until another F×M clocks have passed. In this way, transient pathological patterns in the F channels cannot upset the operation of the circuit. As in FIG. 9, FIG. 10 leaves out clocks for clarity. Also in practice, register 172 need be only F×(M−1)+1 bits long, because it is only necessary to encompass just all the bits containing the signature word, not the entire frame.

Referring to FIG. 11, an overall drawing of the hub, signal 171 in FIG. 9 becomes signal 112 in FIG. 11. This is in turn fed to fiber optic transceiver 125 in FIG. 11, which feeds a fiber optic cable 101, which feeds the base unit 100.

Referring to FIG. 12, which is a diagram of the base 100, the cable 101 feeds a fiber optic transceiver module 113, which is a complement to 125, and its output, 112, feeds the base processing circuitry 106.

Referring to FIG. 13, a detailed drawing of the downlink base processing circuitry, the signal from 113, 112, enters a serial to parallel conversion process 152 and a demultiplexer and de-formatter 150. The circuitry of FIG. 10 is contained within process 152. The section 152 is the complement of the hub processing, and the section 150 contains N circuits that are the complements of the remote head processing, one circuit being associated with each remote head. A clock, 153, is extracted from the serial to parallel conversion process 152 by a phase lock loop circuit. It will be familiar to those skilled in the art as to how this is done. Since this clock is equal to the serial data rate, it will have to be divided by N+1 in 154 to get the parallel word rate clock 155. The demultiplexer 150 separates the video and data (110) signals, and routes the received video and data channels to their proper destinations. Each video signal is routed to a digital to analog converter, where it is output as RS170 or CCIR video 108 to the analog output port that corresponds to its remote head.

Referring back to FIG. 12, each video 108 goes to an output section 107 that contains analog video amplifiers, filters and adjustments to correct for any distortions incurred in the digital to analog conversion process. The data signals 110 are routed to the output portions of data input/output ports 109, one associated with each remote head. These output data that originated at a complementary port at the corresponding remote head. These signals could include, but are not limited to, camera status signals, camera control feedback signals, or any general-purpose signal of a protocol including, but not limited to, RS232, RS422, or RS485. The circuits 109 are programmable as to the aforementioned protocols.

Now we will trace the path of data and control signals from the base 100 to the remote heads. The data input/output ports 109 in FIG. 12 are bidirectional and can accept as well as output data in the protocols mentioned above. The data 110 to be unlinked to the hub 102 and from there onward to the individual heads 103 is fed to the base-processing unit 106. FIG. 14 is a detailed diagram of the uplink side of 106. Referring to FIG. 14, the data 110 destined for each of the N heads first goes to a microcontroller-controlled switch 148. The microcontroller 115 controls the BERT process via its bus 114. This switch is used during BERT testing to substitute digital data test sequences 118 from the BERT unit 116 in FIG. 12 for the user data inputs 110. This test data is then looped through the system, from the base to the hub to a selected head and back again, where it is compared with what was sent. The switch 148 can selectively choose which of the N channels to substitute the test signal. In normal operation all N data inputs 110 are passed straight through. The outputs 149 of the switch 148 go to parallel to serial converter 137.

Each channel has four serial data and/or control bits, destined for its corresponding remote head 103. There are also four serial data bits 120 from the auxiliary data interface 121 in FIG. 12 to be uplinked to the hub 102, plus another sub-packet of four control bits, which selects the test-pattern generator operating modes in the heads as well. Thus, the parallel to serial converter must assemble a serial data word comprised of (N+2) sub-packets, where a sub-packet is the collection of the four bits for each channel. Each of these bits is sampled at its corresponding input/output port, as previously described. The converter 137 must also insert a reference bit so that the start of each composite data word can be determined. The reference bit can be in the form of the signature word described earlier or it can be in the form of additional start and stop bits added to the composite word. The reference bit will be used by each destination circuit to select the sub-packet intended for it, by counting the number of bits starting from the reference to the start of its assigned sub-packet. Each destination circuit, whether it is in a remote head or the hub, has a programmable address so that it can select the sub-packet intended for it. The data throughput requirements on the uplink are not as stringent as on the downlink because video is not being transported, only data. Thus, more flexibility in transmission schemes is permitted at the expense of bandwidth requirements.

A master clock 147 also clocks the parallel to serial converter. This clock, when used to drive 137 and recovered by the destination circuits in the hub 102 or heads 103, will become the master, or reference clock for the entire system. Specifically, this master clock will be recovered in the hub 102 to be the hub clock 124 in FIG. 11 and FIG. 8. It will be recovered in the head 103 to become the clock 135 in FIG. 4. Finally, as it is used to generate the downlink video and data stream from the head 103, it will be recovered once again at the hub 102 in FIG. 6 to become clock 135 there. The significance of this master clock was explained previously. It will be known to those skilled in the art how clock recovery from a serial data stream can be carried out via phase lock loop techniques.

Referring back to FIG. 14, the output of 137, the serial composite data word 111 is fed to a fiber optic transceiver module 113 in FIG. 12, which in turn feeds the bidirectional fiber optic cable 101 going to the hub 102.

Referring to FIG. 11, we see that the uplink data 111, after being output from fiber optic transceiver module 125 via cable 101 from the base 100, is distributed to each of the head-to-hub interface modules 123 as well as to the hub processing unit 119. Referring to FIG. 11, we see that the data stream 111 goes to a serial to parallel conversion and clock recovery process 138 that recovers the hub clock 124 and the data packet intended for the hub, which is output to the hub end user interface 120. The clock recovery and data retrieval are carried out in 138 as described above. Referring to FIG. 6, we see that the data stream 111 is simply passed on to the fiber optic transceiver modules 113 in each hub-to-head interface module 123 for uplink to each remote head over fiber optic cable 101.

Referring to FIGS. 3 and 4, the data stream 111, after being received by fiber optic transceiver module 125, is input to head processing circuit 127. There, the address for that head 126 enables serial to parallel conversion circuit 138 to select and output the intended data 110, test-pattern generator control data 128, and recovered clock 135 as described earlier. The test pattern generator word has its own fixed address within the composite serial data word 111 and this is the same for all heads. The test pattern generator word also allows the data 110 to be looped back into the serial to parallel conversion circuit 137 so that BERT testing can be carried out as described earlier. This is not shown in FIG. 4 for clarity. When this looped back data is ultimately received at the base in FIG. 13, a switch 156 selects, via the microcontroller bus 114, which of the N channels to select so that the output 117 can be fed to the BERT unit 116. The channel selected should be the same one selected by switch 156 in FIG. 13. Streams 117 and 118 are then compared in BERT unit 116 for errors, which are reported via bus 114 to microcontroller 115. It should be noted that the functionality associated with microcontroller 115 may be implemented in other embodiments utilizing a microprocessor or other type of processing device.

In the single source embodiment that is shown in overall form in FIG. 2, there is no hub unit, because there is only one remote head to be interfaced. The base unit for this embodiment is also simplified and is shown in FIG. 15. It has a fiber optic transceiver module 113 which outputs serial data 112 to serial to a parallel conversion and clock recovery system 152 similar to those in the multi-head embodiment hub, which in turn outputs data and clock to D to A converter 108 and video output circuitry 107, similar to those in the multi-head embodiment base unit. Serial data signals 110 are also output to a data interface port 109 similar to those in the multi-head embodiment. This interface port 109 also accepts input data 110 to be input to a parallel to serial converter 137 similar to that in the multi-head embodiment, which also provides for embedding of a master clock signal 147, as in the multi-head embodiment. The resulting data stream 111 is fed to fiber optic transceiver 113 for transmission to the head. The data format is similar to the multi-head embodiment, with the exception that most of the available slots for data packets are empty.

The present invention may be implemented in the foam of an uncompressed visual, aural and control system for use in a broadcast or surveillance environment or other application, using bidirectional high speed serial synchronous digital transmission. The system may include a base processing unit that accepts data and/or camera control signals at a plurality of data and/or control interface ports, and combines and transmits these to a central processing hub for further distribution to a plurality of corresponding remote interface heads, and that also receives and separates uncompressed, real-time, low latency, video, audio and data signals from this central hub that had originated from these remote interface heads and outputs these signals at the corresponding data and/or control interface ports, as well as corresponding video ports. The system may further include a central hub and a plurality of remote interface units for connecting a camera or other controllable video source. Each of the remote interface units receives data and/or camera control signals from the central hub and which also transmits video and data signals to the central hub without need for compression. The central hub receives and separates combined data and/or control signals from the base unit for transmission to the proper corresponding remote interface unit, and receives and combines uncompressed video, audio and data signals from these remote interface units for transmission to the base processing unit.

Such an uncompressed visual, aural and control system, or other system implementation of the present invention, may include a number of additional elements, such as, by way of example, one or more of the following elements.

1. A remotely controllable video and audio test signal generator in each of the remote heads containing a plurality of test patterns required for carrying out various system tests.

2. A visual character generator for the purpose of identifying the video feed and source as well as provide a visual indication of alarm and error conditions in the system.

3. An aural audio and voice recorder and generator for the purpose of identifying the audio feed and source as well as providing an aural indication of alarm and error conditions in the system.

4. A selectable cable equalizer in each remote interface unit and/or any video interface on the network for compensating the effects of long cable runs between the remote interface unit and the analog video source.

5. A composite serial data word broadcast by the base unit to the central hub and from there to the remote interface heads, containing the packetized and addressable control and data signals for each of the heads.

6. A means of distributing a master clock signal throughout the system, for the purpose of synchronizing data streams so that they can be combined in the central hub.

7. A means of activating and choosing a video test signal instead of the video signal from the source that is connected to the remote interface unit.

8. A means of activating and programming of the visual character generator from the source that is connected to the remote interface unit.

9. A means of activating and programming of the aural audio and voice recorder and generator from the source that is connected to the remote interface unit.

10. A means of synchronizing for multiplexing, at the central hub, digitized signals from the multiplicity of remote interface heads into a single data stream for transmission to the base, without the need for large frame store memories.

11. An embedded signature word with a matched filter technique that is used as a reference to de-multiplex, at the base, the plurality of video and data signals that were combined at the central hub 12. An embedded signature word and a word recognition technique that is resistant to pathological data contained in the video and/or data streams.

13. A means of selectively performing bit-error-rate testing on any one data and/or control channel.

14. A video and audio analyzer to measure and quantify video and audio quality and performance.

15. Remote interface heads with a plurality of video, audio, data and/or camera control signal interfaces.

Also, a given system implementing the invention may be configured in a ring configuration including a plurality of video, audio, data and/or camera control signal add and drop interfaces.

Such a system can be expanded for increased capacity using optical multiplexing such as coarse wave-division multiplexing and/or dense wave-division multiplexing.

In addition, a system in accordance with the invention can be expanded for increased capacity using a super hub to multiplex a multitude of hubs. The system is indefinitely scalable using this technique of hubs multiplexed into super hubs. Many hubs and super hubs can be daisy-chained or cascaded together to add additional capacity as needed.

The system may be configured with a multitude of video, audio, data and/or camera control input interfaces at the base unit with transport to output interfaces at any or all remote head units at any location of the network. The system can support multiple bidirectional video, audio, data and/or camera control signals between any points on the network.

The system may be configured to support interface input/outputs of all formats of analog and digital video, audio, data and/or camera control including but not limited to serial digital video, DV Firewire, high definition video, DVB/ASI, medical imaging, radar displays, tactical displays, cockpit displays, flight simulators, high resolution computer graphics, component video, composite video, digital audio, surround sound, time-code, fiber optic video, fiber optic audio, fiber optic data, etc.

Again, it should be emphasized that the particular embodiments described above are presented by way of illustrative example only, and should not be construed as limiting the present invention to any specific embodiment or group of embodiments.

For example, the invention does not require the particular number, type or arrangement of elements, interconnections or signals shown and described in conjunction with the above-described embodiments. Alternative embodiments thus need not incorporate any particular aspect of the arrangements shown in the figures or otherwise described in conjunction therewith. These and numerous other alternative embodiments will be readily apparent to those skilled in the art.

What is claimed is:

1. A system for communication of video signals from a plurality of remote devices to one or more monitoring devices, and for communication of control signals from one or more control devices to the plurality of remote devices, the system comprising:

a plurality of remote interface units each coupled to a corresponding one of the remote devices;

a base unit coupled to the one or more monitoring devices and the one or more control devices; and a central hub coupled between the base unit and the plurality of remote interface units;

wherein the central hub is coupled to the base unit by a first fiber optic link, and is coupled to the remote interface units by additional fiber optic links;

the central hub combining video signals received from the remote interface units over the additional fiber optic links into a single downlink stream for transmission to the base unit over the first fiber optic link;

the base unit processing the single downlink stream to obtain video signals for distribution to the one or more monitoring devices;

the base unit combining control signals received from the one or more control devices into a single uplink stream for transmission to the central hub over the first fiber optic link;

the central hub generating from the single uplink stream at least one additional uplink stream for delivery to the remote interface units over the additional fiber optic links;

wherein at least one of the one or more control devices is operative to control a positioning of at least one of the plurality of remote devices;

wherein a parallel-to-serial converter in the central hub forms the single downlink stream by time-division multiplexing a signature waveform and portions of the respective video signals in a designated sequence; and wherein a serial-to-parallel converter in the base unit determines the designated sequence by recognizing the signature waveform.

2. The system of claim 1 wherein the video signals comprise real-time video signals transmitted through the system, from the respective remote devices to the one or more monitoring devices, in an uncompressed format.

3. The system of claim 1 wherein associated with a given one of the video signals is at least one additional signal comprising a downlink data signal transmitted through the system from one of the remote devices to the one or more monitoring devices, the downlink data signal being time-division multiplexed into the single downlink stream for transmission from the central hub to the base unit.

4. The system of claim 1 wherein associated with a given one of the control signals is at least one additional signal comprising an uplink data signal transmitted through the system from the one or more control devices to one of the remote devices, the uplink data signal being time-division multiplexed into the single uplink stream for transmission from the base unit to the central hub.

5. The system of claim 1 wherein a given remote interface unit receives an analog video signal from one of the remote devices and converts the analog video signal into a digital video signal for transmission to the central hub over at least one of the additional fiber optic links.

6. The system of claim 1 wherein the base unit converts a digital video signal, received in the downlink stream from the central hub over the first fiber optic link, into an analog video signal for distribution to the one or more monitoring devices.

7. The system of claim 1 wherein the central hub is configured to deliver an output data signal to an additional device coupled thereto, and to receive an input data signal from said additional device, said input and output data signals being combinable into at least one of the single uplink stream and the single downlink stream.

8. The system of claim 1 wherein the video signals are time-division multiplexed into the single downlink stream by the central hub.

9. The system of claim 1 wherein the control signals are time-division multiplexed into the single uplink stream by the base unit.

10. The system of claim 1 wherein the at least one additional uplink stream generated by the central hub is substantially the same as the single uplink stream received by the central hub from the base unit.

11. The system of claim 1 wherein each of the uplink streams comprises one or more embedded signature words which permit each of the central hub and the remote interface units to identify particular portions of the streams that are directed thereto.

12. The system of claim 1 wherein each of the uplink streams comprises a composite serial data word, the serial data word comprising packetized and addressable control and data signals for each of the remote devices.

13. The system of claim 1 wherein the downlink stream comprises one or more embedded signature words which are utilized by the base unit to demultiplex signals that were combined at the central hub.

14. The system of claim 1 wherein the central hub comprises one of a plurality of central hubs of the system, the plurality of central hubs being multiplexed together to form a super hub within the system.

15. The system of claim 1 wherein the central hub is directly coupled to each of the plurality of remote interface units by respective ones of the additional fiber optic links.

16. The system of claim 15 wherein the central hub generates from the single uplink stream a plurality of uplink streams for delivery to respective ones of the remote interface units over the additional fiber optic links.

17. The system of claim 1 wherein the central hub and the plurality of remote interface units are interconnected in a ring configuration using the additional fiber optic links.

18. The system of claim 1, wherein a given remote interface unit receives a video signal from one of the remote devices and processes the video signal for transmission to the central hub over at least one of the additional fiber optic links; and wherein the base unit processes the video signal, received in the downlink stream from the central hub over the first fiber optic link, for distribution to the one or more monitoring devices.

19. The system of claim 1, wherein the base unit comprises a processing device configured to control substitution of a bit error rate test signal from a bit error rate test unit for one of the control signals directed to a given one of the remote devices.

20. A system for communication of video signals from a plurality of remote devices to one or more monitoring devices, and for communication of control signals from one or more control devices to the plurality of remote devices, the system comprising:

a plurality of remote interface units each coupled to a corresponding one of the remote devices; a base unit coupled to the one or more monitoring devices and the one or more control devices; and a central hub coupled between the base unit and the plurality of remote interface units;

wherein the central hub is coupled to the base unit by a first fiber optic link, and is coupled to the remote interface units by additional fiber optic links;

the central hub combining video signals received from the remote interface units over the additional fiber optic links into a single downlink stream for transmission to the base unit over the first fiber optic link;

the base unit processing the single downlink stream to obtain video signals for distribution to the one or more monitoring devices;

the base unit combining control signals received from the one or more control devices into a single uplink stream for transmission to the central hub over the first fiber optic link;

the central hub generating from the single uplink stream at least one additional uplink stream for delivery to the remote interface units over the additional fiber optic links;
wherein at least one of the one or more control devices is operative to control a positioning of at least one of the plurality of remote devices;
wherein the base unit comprises a processing device configured to control substitution of a bit error rate test signal from a bit error rate test unit for one of the control signals directed to a given one of the remote devices, the uplink streams comprising the bit error rate test signal and a command for controlling the given remote device to loop back the bit error rate test signal such that the bit error rate test signal is returned to the bit error rate test unit in the downlink stream.

21. A system for communication of a video signal from a remote device to a monitoring device, and for communication of a control signal from a control device to the remote device, the system comprising:
a remote interface unit coupled to the remote device; and
a base unit coupled to the monitoring device and the control device;
wherein the base unit is coupled to the remote interface unit by a first fiber optic link;
the remote interface unit combining a video signal and a data signal into a single downlink stream for transmission to the base unit over the first fiber optic link;
the base unit processing the single downlink stream to obtain a video signal for distribution to the monitoring device;
a parallel-to-serial converter in the base unit combining a control signal from the control device and a master clock signal into a single uplink stream for transmission to the remote interface unit over the first fiber optic link;
the remote interface unit generating from the single uplink stream a control signal for delivery to the remote device;
wherein the control device is operative to control a positioning of the remote device;
wherein the master clock signal is recovered by a serial-to-parallel converter in the remote interface unit for use in combining the video signal and the data signal into the single downlink stream.

22. The system of claim 21, wherein the base unit comprises a processing device configured to control substitution of a bit error rate test signal from a bit error rate test unit for one of the control signals directed to a given one of the remote devices.

23. A signal distribution method for use in a system for communication of video signals from a plurality of remote devices to one or more monitoring devices, and for communication of control signals from one or more control devices to the plurality of remote devices, the system comprising a plurality of remote interface units each coupled to a corresponding one of the remote devices, a base unit coupled to the one or more monitoring devices and the one or more control devices, and a central hub coupled between the base unit and the plurality of remote interface units, the central hub being coupled to the base unit by a first fiber optic link and being coupled to the remote interface units by additional fiber optic links, the method comprising the steps of:
combining in the central hub video signals received from the remote interface units over the additional fiber optic links into a single downlink stream for transmission to the base unit over the first fiber optic link;
processing the single downlink stream in the base unit to obtain video signals for distribution to the one or more monitoring devices;
combining in the base unit control signals received from the one or more control devices into a single uplink stream for transmission to the central hub over the first fiber optic link; and
generating in the central hub from the single uplink stream at least one additional uplink stream for delivery to the remote interface units over the additional fiber optic links;
wherein at least one of the one or more control devices is operative to control a positioning of at least one of the plurality of remote devices;
wherein a parallel-to-serial converter in the central hub forms the single downlink stream by time-division multiplexing a signature waveform and portions of the respective video signals in a designated sequence; and
wherein a serial-to-parallel converter in the base unit determines the designated sequence by recognizing the signature waveform.

24. A system for communication of video signals from a plurality of remote devices to one or more monitoring devices, and for communication of control signals from one or more control devices to the plurality of remote devices, the system comprising:
a plurality of remote interface units each coupled to a corresponding one of the remote devices;
a base unit coupled to the one or more monitoring devices and the one or more control devices; and
a central hub coupled between the base unit and the plurality of remote interface units;
wherein the central hub is coupled to the base unit by a first fiber optic link, and is coupled to the remote interface units by additional fiber optic links;
the central hub combining video signals received from the remote interface units over the additional fiber optic links into a single downlink stream for transmission to the base unit over the first fiber optic link;
the base unit processing the single downlink stream to obtain video signals for distribution to the one or more monitoring devices;
the base unit combining control signals received from the one or more control devices into a single uplink stream for transmission to the central hub over the first fiber optic link;
the central hub generating from the single uplink stream at least one additional uplink stream for delivery to the remote interface units over the additional fiber optic links;
wherein at least one of the one or more control devices is operative to control a positioning of at least one of the plurality of remote devices;
wherein a parallel-to-serial converter in the base unit combines the control signals received from the one or more control devices with a master clock signal into the single uplink stream for transmission to the central hub over the first fiber optic link; and
wherein the master clock signal is recovered by a serial-to-parallel converter in the central hub for use in combining the video signals into the single downlink stream.

* * * * *